United States Patent
Sekiyama

(10) Patent No.: US 9,854,648 B2
(45) Date of Patent: Dec. 26, 2017

(54) ELECTRONIC DEVICE AND METHOD FOR CONTROLLING ELECTRONIC DEVICE

(71) Applicant: ICOM INCORPORATED, Osaka-shi, Osaka (JP)

(72) Inventor: Yoshio Sekiyama, Osaka (JP)

(73) Assignee: ICOM INCORPORATED, Osaka-shi, Osaka (JP)

(*) Notice: Subject to any disclaimer, the term of this patent is extended or adjusted under 35 U.S.C. 154(b) by 134 days.

(21) Appl. No.: 15/138,872

(22) Filed: Apr. 26, 2016

(65) Prior Publication Data
US 2017/0027041 A1    Jan. 26, 2017

(30) Foreign Application Priority Data
Apr. 30, 2015   (JP) .................................. 2015-93589

(51) Int. Cl.
| | | |
|---|---|---|
| H05B 37/02 | (2006.01) | |
| H05B 33/08 | (2006.01) | |
| G08B 21/20 | (2006.01) | |
| H04B 1/3827 | (2015.01) | |

(52) U.S. Cl.
CPC ......... *H05B 37/0227* (2013.01); *G08B 21/20* (2013.01); *H04B 1/3827* (2013.01); *H05B 33/0854* (2013.01)

(58) Field of Classification Search
CPC ................ H05B 37/02; H05B 37/0227; H05B 33/0854; H04B 1/3827; H04B 1/3888; H04B 2001/3894; H04M 1/18; H04M 1/22; H04M 1/72572; H04M 1/03; H04M 2250/12; G08B 21/20; G08B 5/36; G08B 7/06
See application file for complete search history.

(56) References Cited

U.S. PATENT DOCUMENTS

| | | | | |
|---|---|---|---|---|
| 6,157,303 A | * | 12/2000 | Bodie ................... | B63C 9/0005 340/539.1 |
| 9,098,992 B2 | * | 8/2015 | Sekiyama .............. | G08B 21/20 |
| 9,461,605 B2 | * | 10/2016 | Sekiyama ............... | H03G 3/20 |
| 9,560,783 B2 | * | 1/2017 | Kang .................... | G06F 1/1635 |

(Continued)

FOREIGN PATENT DOCUMENTS

| | | |
|---|---|---|
| JP | 04-135038 U | 12/1992 |
| JP | 2013-229826 A | 11/2013 |

*Primary Examiner* — Haissa Philogene
(74) *Attorney, Agent, or Firm* — Kilyk & Bowersox, P.L.L.C.

(57) ABSTRACT

An electronic device including a submersion detector, illuminants, a lighting circuit, a controller, and an orientation detector. The submersion detector detects submersion of the device and detect retrieval of the device. The illuminants are arranged inside a casing such that at least one of the illuminants is visible from above water when the device is submerged in any submersion orientation. The lighting circuit lights up at least one of the illuminants in response to an input of a lighting signal. The controller generates and outputs the lighting signal to the lighting circuit for a period of time from the submersion at least until the retrieval so as to light up the at least one of the illuminants. The orientation detector detects a submersion orientation of the device. Only the at least one of the illuminants that is visible from above water lights up, in accordance with the detected submersion orientation.

20 Claims, 10 Drawing Sheets

(56) References Cited

U.S. PATENT DOCUMENTS

2013/0285809 A1    10/2013   Sekiyama
2017/0024982 A1*   1/2017   Sekiyama ................ G08B 5/36
2017/0155755 A1*   6/2017   Kondo .............. H04M 1/72527

* cited by examiner

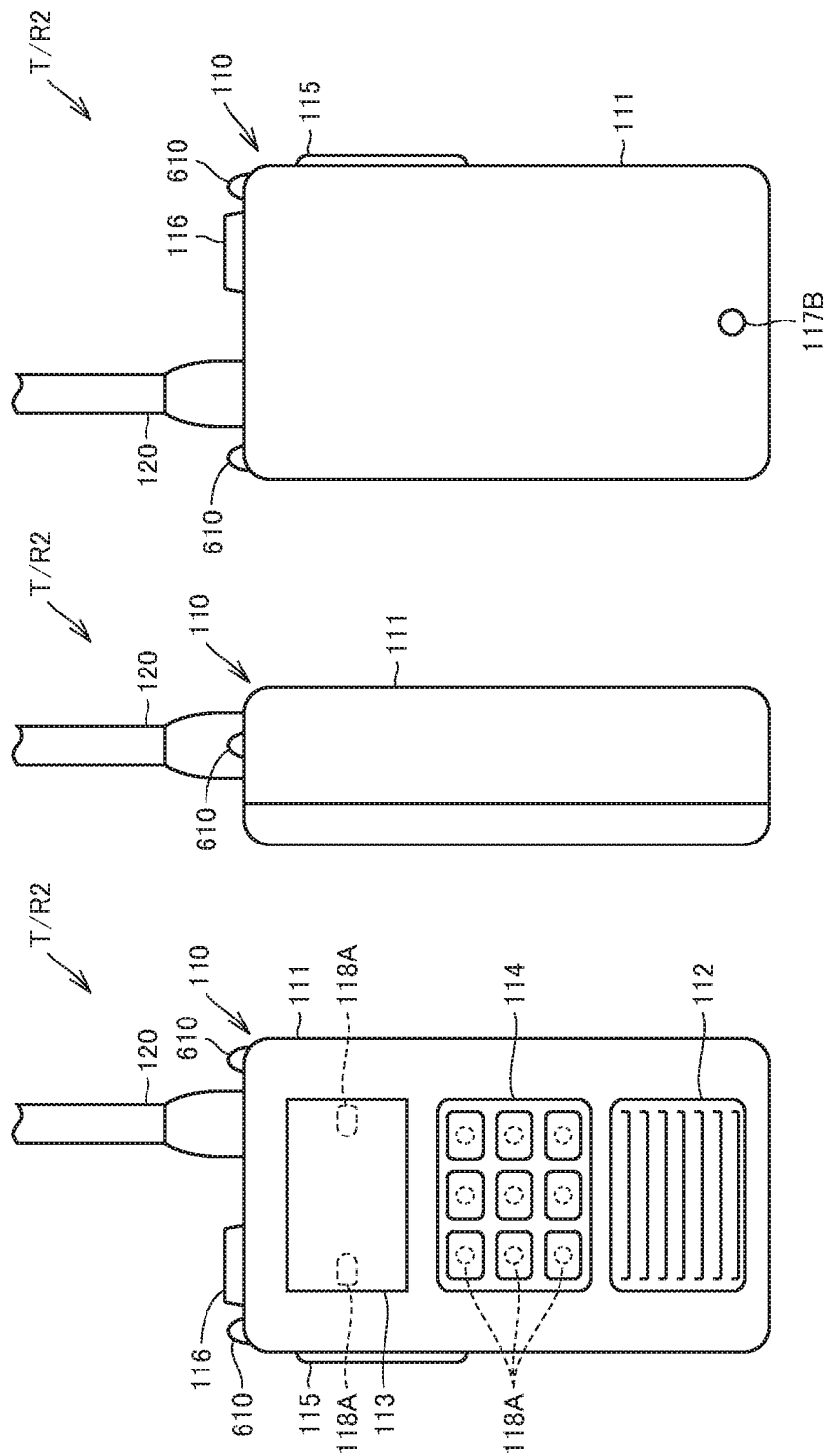

ELECTRONIC DEVICE AND METHOD FOR CONTROLLING ELECTRONIC DEVICE

CROSS-REFERENCE TO RELATED APPLICATION

The present application claims priority under 35 U.S.C. §119 of Japanese Patent Application No. 2015-93589 filed on Apr. 30, 2015, the disclosure of which is expressly incorporated by reference herein in its entity.

BACKGROUND OF THE INVENTION

Technical Field

The invention relates to electronic devices and methods for controlling electronic devices. More particularly, the invention relates to electronic devices configured to float in water if dropped, and methods for controlling the electronic devices.

Background Art

Some conventional electronic devices, such as transceivers, are used near water. In anticipation of being accidentally splashed with water or dropped into water, many of such electronic devices are made watertight to prevent entry of water. Japanese utility model publication No. H04-135038 discloses an electronic device configured to float on water to prevent the electronic device from sinking under water when dropped into water and thereby to allow retrieval of the device.

However, a user may be unable to find and retrieve an electronic device floating on water at nighttime or when visibility is poor. Therefore, the inventor of the present application previously invented an electronic device as disclosed in Japanese patent publication No. 2013-229826 that can be found easily even when it is dropped into water at nighttime or when visibility is poor.

This electronic device includes "a submersion detector for detecting that the electronic device itself falls onto the surface of water or into water (hereinafter referred to as "submersion") and for detecting retrieval of the electronic device from the surface of water or from under water (hereinafter referred to as "retrieval"), a illuminant provided inside a casing, a lighting circuit configured to light the illuminant in response to an input of a lighting signal, a controller configured to flash the illuminant by generating and inputting the lighting signal to the lighting circuit at predetermined flashing intervals for a period of time from the submersion at least until the retrieval, and a power control circuit for supplying power to the controller to activate the controller in a case where power is not supplied to the controller when the submersion detector detects submersion".

In short, the electronic device upon submersion makes the illuminant light up to allow a user to easily find the electronic device if dropped into water at nighttime or when visibility is poor. As for the submersion detector, the illuminant, the lighting circuit, the controller, the power control circuit, Japanese patent publication No. 2013-229826 and its corresponding publication US 2013/0285809 is incorporated herein by reference.

SUMMARY OF INVENTION

The above conventional electronic device is easy to find at nighttime or when visibility is poor because the illuminants light up during submersion of the electronic device. However, all the illuminants, including invisible ones located under water, light up during the submersion, resulting in useless power consumption.

The invention has been made in view of the above circumstances and provides an electronic device with reduced power consumption by making only a visible illuminant emit light depending on a floating state of the electronic device.

An electronic device in aspect of the invention a submersion detector, a plurality of illuminants, a lighting circuit, a controller, and an orientation detector. The submersion detector is configured to detect submersion of the electronic device and detect retrieval of the electronic device. The submersion means that the electronic device itself falls onto a surface of water or into water, and the retrieval means that the electronic device itself is retrieved from the surface of the water or from under the water. The illuminants are provided inside a casing and arranged such that at least one of the illuminants is visible from above water when the electronic device is submerged in any submersion orientation. The lighting circuit is configured to light up the at least one of the illuminants in response to an input of a lighting signal. The controller is configured to generate and output the lighting signal to the lighting circuit for a period of time from the submersion at least until the retrieval so as to light up the at least one of the illuminants. The orientation detector is configured to detect a submersion orientation of the electronic device. Only the at least one of the illuminants that is visible from above water lights up, in accordance with the submersion orientation of the electronic device detected by the orientation detector.

A plurality of submersion detectors may be arranged such that at least one of the submersion detectors is submerged when the electronic device is submerged in any submersion orientation. The submersion detectors may also serve as the orientation detector. The at least one of the submersion detectors to be submerged in each submersion orientation may correspond to the at least one illuminant visible from above water in the submersion orientation.

The orientation detector may be an orientation sensor configured to detect a submersion orientation of the electronic device and transmit an orientation signal in accordance with the submersion orientation of the electronic device. The illuminants may be configured such that only the at least one of the illuminants that is visible from above water lights up, in response to the orientation signal from the orientation sensor when the submersion detector detects submersion of the electronic device.

A method of controlling an electronic device in an aspect of the invention includes operating a submersion detector to detect submersion of the electronic device and to detect retrieval of the electronic device, operating an orientation detector to detect a submersion orientation of the electronic device, and operating a controller to send a lighting circuit a lighting signal to light up at least one of illuminants provided in a casing for a period of time from the submersion of the electronic device at least to the retrieval of the electronic device. The operating of the controller to send the lighting signal includes operating the controller to send, in accordance with the detected submersion orientation of the electronic device, to the lighting circuit a lighting signal to light up only the at least one of the illuminants that is visible from above a surface of water in the submersion orientation.

The electronic device an aspect of the invention is configured to light up only visible one or ones of the illuminants in accordance with the submersion orientation of the electronic device. This electronic device reduces power consumption during submersion.

Also, the electronic device is configured such that an easily visible one or ones of the illuminants lights up in any submersion orientation, there is no need to arrange components of the electronic device in such a manner as to stabilize the submersion orientation of the electronic device. Therefore, the electronic device can be designed with reduced limitations in terms of the exterior and interior structure.

BRIEF DESCRIPTION OF DRAWINGS

The present invention can be even more fully understood with the reference to the accompanying drawings which are intended to illustrate, not limit, the present invention.

FIG. 1A is a schematic front view, FIG. 1B is a schematic left side view, and FIG. 1C is a schematic back view.

FIG. 7A is a schematic side view of the first submersion orientation with the front face facing upward, and FIG. 7B is a schematic side view of the second submersion orientation with the back face facing upward.

FIGS. 8A to 8C are external views of an electronic device (transceiver) in second embodiment of the invention, where FIG. 8A is a schematic front view, FIG. 8B is a schematic left side view, and FIG. 8C is a schematic back view.

FIG. 10A is a schematic side view of a first submersion orientation with a front face facing upward, and FIG. 10B is a schematic side view of a second submersion orientation with a back face facing upward.

DESCRIPTION OF EMBODIMENTS

Figure 1:
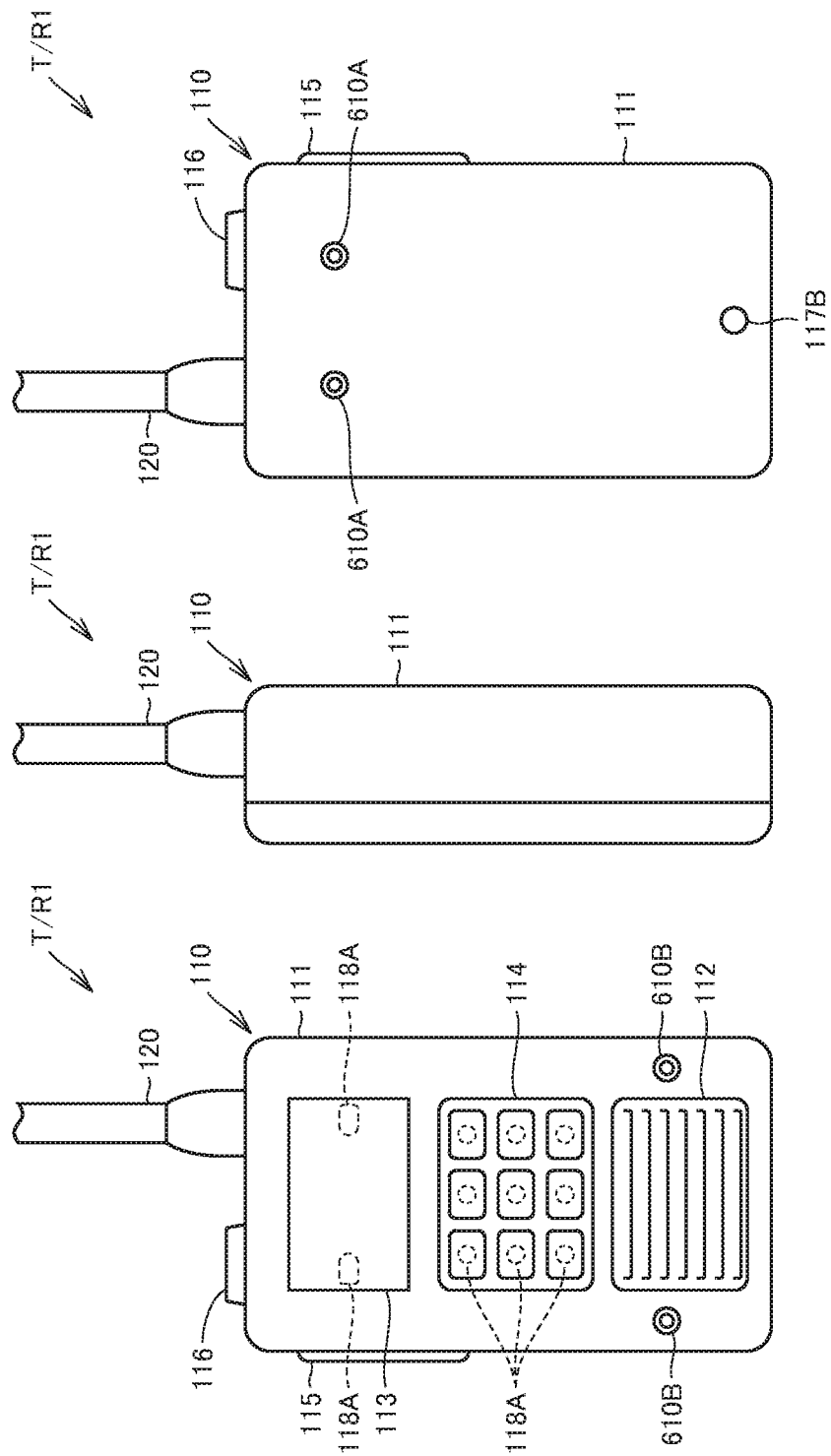
FIGS. 1A to 1C are external views of an electronic device (transceiver) in the first embodiment of the invention, where

An electronic device in an embodiment of the invention is a transceiver T/R1. The transceiver T/R1 includes two submersion detectors (i.e., a frontside submersion detector 600A and a backside submersion detector 600B), frontside light-emitting diodes (LEDs) 118A and a backside LED 117B, a frontside lighting circuit 500A and a backside lighting circuit 500B, and a controller 200. The frontside submersion detector 600A and the backside submersion detector 600B are configured to detect submersion of the transceiver and detect retrieval of the transceiver. As used herein the term "submersion" means that the electronic device/transceiver falls onto the surface of water or into water. As used herein the term "retrieval" means that the electronic device/transceiver is retrieved by a user from the surface of the water or from under the water. The frontside submersion detector 600A and the backside submersion detector 600B are arranged such that at least one of them is submerged when the transceiver is submerged. The frontside LEDs 118A and the backside LED 117B are illuminants provided in a casing 111 of a body 110. The frontside LEDs 118A and the backside LED 117B are arranged such that at least one of them is visible from above the water when the transceiver is submerged in any submersion orientation. As used herein the term "submersion orientation" means how the electronic device/transceiver is oriented when it is submerged. The frontside lighting circuit 500A lights up the frontside LEDs 118A in response to an input of a lighting signal LONA. The backside lighting circuit 500B lights up the backside LED 117B in response to an input of a lighting signal LONB. The controller 200 is configured to generate a lighting signal LONA and output the generated signal LONA to the frontside lighting circuit 500A for a period of time from the submersion until the retrieval, thereby lighting up the frontside LEDs 118A. The controller 200 is also configured to generate a lighting signal LONB and output the generated signal LONB to the backside lighting circuit 500B between the submersion and the retrieval, thereby lighting up the backside LED 117B. The frontside submersion detector 600A and the backside submersion detector 600B also serve as an orientation detector to detect submersion orientations of the transceiver. More particularly, the frontside submersion detector 600A detects submersion of the transceiver as submerged in a first submersion orientation, in which the front face of the casing 111 faces upward. The backside submersion detector 600B detects submersion of the transceiver as submerged in a second submersion orientation, in which the back face of the casing 111 faces upward.

Referring to the drawings, the following provides an overview of the transceiver T/R1 to which the invention is applied. The transceiver T/R1 is a hand-held device for marine communication adapted for wireless communication in a marine VHF radio band. The transceiver T/R1 in outward appearance has a body 110 and an antenna 120 on the top face of the body 110. The transceiver T/R1 is reduced in overall weight by using a light-weight and large-capacity power source, such as a lithium ion battery. The casing 111 of the body 110 is watertight. The weight reduction and water tightness allows the transceiver T/R to rise to the surface of water without sinking completely when falling into water.

The transceiver T/R1 is configured such that when submerged, it lights up at least one of the illuminants and simultaneously sounds an alarm to apprise a user of the submersion and the location of the transceiver. The transceiver T/R1 is also configured such that when retrieved from the submersion (when the retrieval occurs), the transceiver stops the lighting of the illuminants and the sounding of the alarm and emits a draining sound for draining water out of a speaker grille 112 of the body 110.

Next, the appearance of the transceiver T/R1 in the first embodiment of the invention will be described in detail. As described above, the transceiver T/R1 has the body 110 including the casing 111, and the antenna 120 provided on the top face of the casing 111 to point upward. The antenna 120 is a rod-shaped antenna with a coiled antenna wire accommodated in a plastic pipe. The antenna wire is a copper wire or an iron wire and thus relatively heavy. The weight of the antenna 120 results in an upward-biased weight distribution of the entire transceiver T/R1.

The front face of the casing 111 is provided with a display 113, a keypad panel 114, and the speaker grille 112, from top to bottom in this order. Provided inside the speaker grille 112 is a loudspeaker SP. Provided on the left side face of the casing 111 is a push-to-talk (PTT) switch 115. On the top face of the casing 111, provided to the left of the antenna 120 is an SP/MIC connector 116 covered with a watertight cap.

The display 113 is a liquid crystal display, and the rear face thereof is provided with LEDs serving as backlights. The display 113 can indicate communication channels, volume, and other various settings.

Disposed on the keypad panel 114 is a plurality of key switches including a power key PS and numeric keys. The power key PS is a key switch to turn the power on/off. When the power key PS is pressed for a predetermined period of time (e.g. for two seconds or longer) by a user, the power of the transceiver T/R1 is switched from on to off or from off to on. The keypad panel 114 is also provided on its rear face with LEDs serving as backlights. The key switches of the keypad panel 114 have key tops of a material and a color that transmit light and are illuminated from the back by the lighting-up of the corresponding backlights. It should be noted that the frontside LEDs 118A are the LEDs serving as backlights for the display 113 and for the key panel 114. The frontside LEDs 118A is also adapted to emit light during submersion.

A pair of first electrodes 610A is provided in upper right and left portions of the rear face of the casing 111. The first electrodes 610A form part of the frontside submersion detector 600A. When the transceiver T/R1 is submerged in the first submersion orientation (described above, also see FIG. 7A), the first electrodes 610A are also submerged and brought into electrical conduction to each other by establishing a short circuiting via water. The conduction of the first electrodes 610A is used by the controller 200 of the transceiver T/R1 (see FIG. 2) to detect submersion of the transceiver T/R1 in the first submersion orientation.

Also, a pair of second electrodes 610B is provided in lower right and left portions of the front face of the casing 111. The second electrodes 610B form part of the backside submersion detector 600B. When the transceiver T/R1 is submerged in the second submersion orientation (described above, also see FIG. 7B), the second electrodes 610B are also submerged and brought into electrical conduction to each other by establishing a short circuiting via water. The conduction of the second electrodes 610B is used by the controller 200 of the transceiver T/R1 (see FIG. 2) to detect submersion of the transceiver T/R1 in the second submersion orientation.

The backside LED 117B, an illuminant, is disposed in a lower part of the back face of the casing 111. The backside LED 117B may be disposed in a slit-like opening in a lower part of the back face of the casing 111. In this case, the opening should be closed with a translucent material. The backside LED 117B in the opening (in the casing 111) may also be used to make the entire material closing the opening to emit light.

Figure 2:
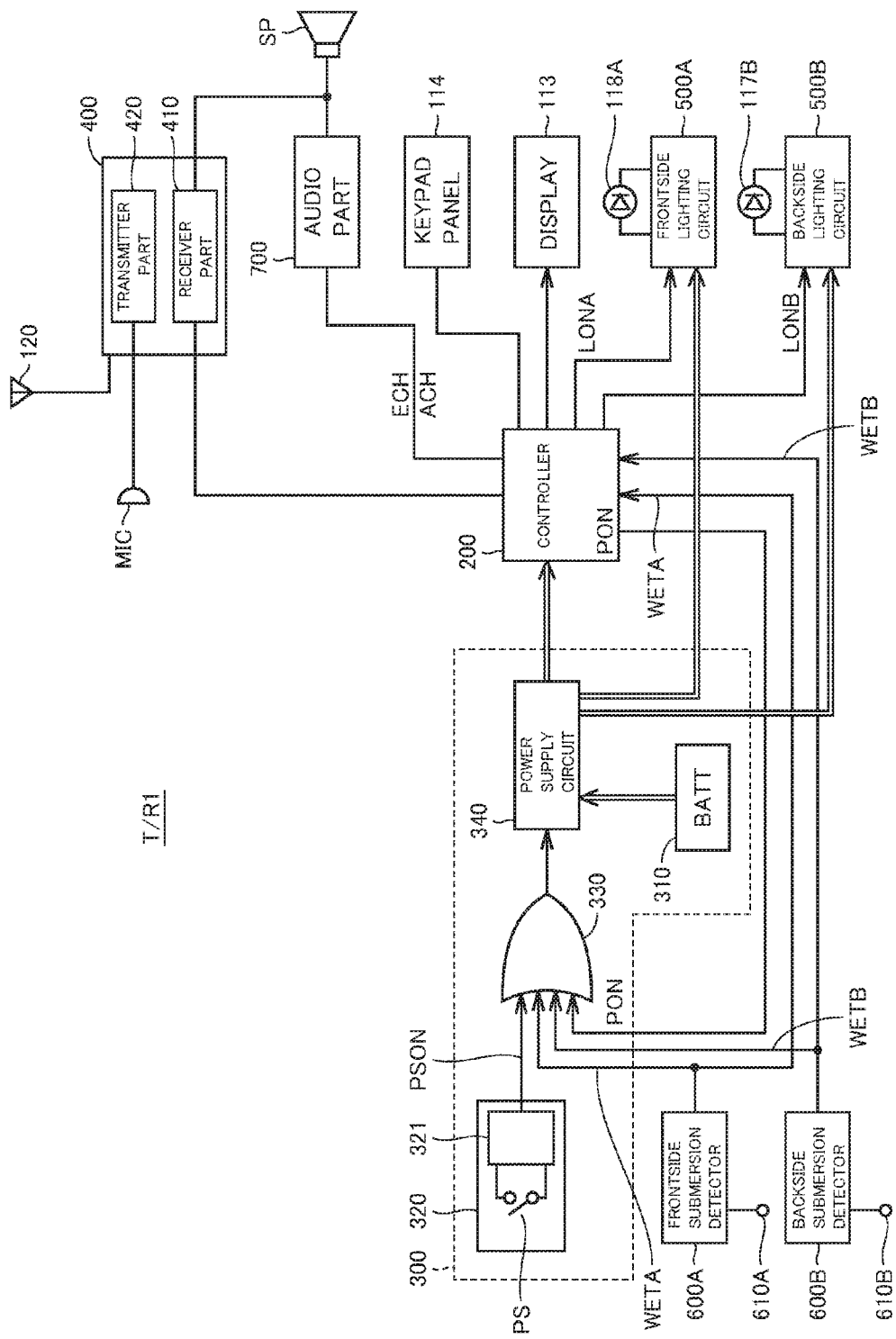
FIG. 2 is a block diagram showing a configuration of the transceiver.

Referring to the block diagram shown in FIG. 2, a circuit configuration of the transceiver T/R1 will be described. This figure shows some circuits of the transceiver T/R1, particularly circuits related to power control, audio signal processing, and communication control.

The transceiver T/R1 includes the controller 200, the power controller 300, the communication unit 400 including a receiver part 410 and a transmitter part 420, the frontside lighting circuit 500A, the backside lighting circuit 500B, the frontside submersion detector 600A, the backside submersion detector 600B, and an audio part 700.

The controller 200 is a so-called microcontroller provided with memory, various interfaces, A/D and D/A converters, etc. in addition to a CPU. The controller 200 controls an entire operation of the transceiver T/R1, including setting operations as shown in the timing charts in FIGS. 3 to 6. The controller 200 is also connected to the display 113 and the keypad panel 114. The controller 200 stores, in its memory, a control program for controlling the operation of the transceiver T/R1.

The power controller 300 includes a battery 310 and controls supply of power to the controller 200, the communication unit 400, the two lighting circuits, namely the frontside lighting circuit 500A and the backside lighting circuit 500B, and the display 113.

The receiver part 410 of the communication unit 400 is a circuit to process reception of high-frequency signals and emission of audio signals. The loudspeaker SP is connected to the final stage of the receiver part 410. The loudspeaker SP is shared by the receiver part 410 and the audio part 700. The transmitter part 420 of the communication part 400 is a circuit to convert audio signals from a microphone MIC into transmission signals of high-frequency and transmit them through the antenna 120.

The frontside lighting circuit 500A is a circuit to light the frontside LEDs 118A (illuminants) in response to the lighting signal LONA from the controller 200. The backside lighting circuit 500B is a circuit to light the backside LED 117B (illuminant) in response to the lighting signal LONB from the controller 200.

As described above, the frontside LEDs 118A act as backlights of the display 113 and the key panel 114 and also as illuminants that light up to inform the location of the transceiver T/R1 when it is submerged. FIGS. 1A to 1C show two frontside LEDs 118A as backlights of the display, nine frontside LEDs 118A as backlights of the key panel 114, and one backside LED 117B. However, the LEDs 118A may be of any number and luminance required to illuminate the display 113 and the keypad panel 114 in their entirety from the back.

The power controller 300 includes, in addition to the battery 310, a power switching circuit 320, an OR circuit 330, and a power supply circuit 340. The battery 310 may be e.g. a lithium ion battery, with voltage of e.g. 7.4 V. The power switching circuit 320 has the above-described power key PS and a hold circuit 321. The hold circuit 321 can output a power switch-on signal PSON. The hold circuit 321 reverses the state (level high "H" or low "L") of the power switch-on signal PSON when the power key PS is kept activated for the predetermined period of time or longer. The power switch-on signal PSON will be input to the OR circuit 330.

The frontside submersion detector 600A includes the pair of first electrodes 610A described above, and the backside submersion detector 600B includes the pair of second electrodes 610B described above. The frontside submersion detector 600A is configured to output a submersion signal WETA indicating electrical conduction between the first electrodes 610A. The backside submersion detector 600B is configured to output a submersion signal WETB indicating electrical conduction between the second electrodes 610B.

The frontside submersion detector 600A lowers the submersion signal WETA to a "low" level (level L) during the time when the first electrodes 610A are electrically conducted to each other. The backside submersion detector 600B lowers the submersion signal WETB to level L during the time when the second electrodes 610B are electrically conducted to each other. The submersion signals WETA, WETB are then input to the OR circuit 330 of the power controller 300 and to the controller 200.

The OR circuit 330 is configured to receive, in addition to the power switch-on signal PSON and the submersion signals WETA and WETB, a power maintaining signal PON from the controller 200.

An output from the OR circuit 330 is input into the power supply circuit 340. When receiving a "high" (H) signal from the OR circuit 330, the power supply circuit 340 supplies power of the battery 310 to the controller 200, the communication part 400, the frontside lighting circuit 500A, and the backside lighting circuit 500B so as to power on the transceiver T/R1.

The frontside lighting circuit 500A is configured to light illuminants, such as the frontside LEDs 118A, in response to a lighting signal LONA at a "high" level (level H) input from the controller 200, i.e. in response to an input of an H signal of a lighting signal LONA. When the controller 200 maintains a lighting signal LONA at level H, the frontside LEDs 118A remains illuminated. When the controller 200 periodically switches a lighting signal LONA between level H and level L, the frontside LEDs 118A flash on and off. When a user turns on the backlights via the keypad panel 114, the controller 200 raises the lighting signal LONA to level H to light up the frontside LEDs 118A.

The backside lighting circuit 500B is also configured to light an illuminant, such as the backside LED 117B in response to a lighting signal LONB at a level H from the controller 200, i.e. in response to an H signal of a lighting signal LONB. When the controller 200 maintains a lighting signal LONB at level H, the backside LED 117B remains illuminated. When the controller 200 periodically switches a lighting signal LONB between level H and level L, the backside LED 117B flash on and off.

It is preferable that the frontside LEDs 118A and the backside LED 117B flash on and off, rather than simply light up, during submersion for the purpose of easy finding of the transceiver T/R1 submerged.

When the transceiver T/R1 is submerged in the first submersion orientation (see FIG. 7A) to cause the submersion signal WETA from the frontside submersion detector 600A to change from level H to level L, the controller 200 changes the lighting signal LONA between level H and L at predetermined flashing intervals to flash the frontside LEDs 118A on and off. When the transceiver T/R1 is retrieved and the submersion signal WETA from the frontside submersion detector 600A changes from level L to level H, the controller 200 continues to flash the frontside LEDs 118A on and off for a predetermined lighting duration. It should be noted that the flashing intervals of the frontside LEDs 118A during submersion and the lighting duration after retrieval may be set by a user as desired.

When the transceiver T/R1 is submerged in the second submersion orientation (see FIG. 7B), to cause the submersion signal WETB from the backside submersion detector 600B to change from level H to level L, the controller 200 changes the lighting signal LONB between level H and L at predetermined flashing intervals to flash the backside LED 117B on and off. When the transceiver T/R1 is retrieved and the submersion signal WETB from the backside submersion detector 600B changes from level L to level H, the controller 200 continues to flash the backside LEDs 117B on and off for a predetermined lighting duration. It should be noted that the flashing intervals of the backside LED 117B during submersion and the lighting duration after retrieval can be set by a user as desired.

The audio part 700 is configured to emit an alarm sound upon receiving an alarm sound generation signal ACH, which is generated by and output from the controller 200 when the submersion signal WETA from the frontside submersion detector 600A changes from level H to level L. The alarm sound is an intermittently emitted sound generated when the transceiver T/R1 is submerged. The alarm sound may be a sinusoidal wave of about 1 kHz, which can be easily recognized by human hearing. The alarm sound may be at a maximum level or may be set to an appropriate level to inform a user of the location with reduced exhaustion of the battery 310.

In a case where the submersion signal WETB from the backside submersion detector 600B changes from level H to level L, the speaker grille 112 faces downward, i.e., the speaker grille 112 is under water. In this case, the controller 200 does not generate an alarm sound generation signal ACH.

The draining sound is generated during a draining operation of the speaker grille and may be a rectangular wave of 300 Hz. The frequency and the waveform of the draining sound can be determined appropriately in accordance with the characteristics of the loudspeaker SP, the volume of the speaker grille 112, the shape of the transceiver T/R1, and other conditions. It is preferable to use a rectangular wave or a sawtooth wave between 100 Hz and 500 Hz.

The controller 200 is activated by being supplied with power voltage from the power controller 300, and configured to control the operation of the transceiver T/R1. The controller 200, in particular, can monitor input change of the submersion signals WETA, WETB from the frontside submersion detector 600A and the backside submersion detector 600B at predetermined time intervals, milliseconds (ms), and executes operations below. The following describes the operations, with reference to FIGS. 3 and 4, in a case where both submersion notification operations, i.e. the flashing of the frontside LEDs 118A and the backside LED 117B and the emission of the alarm sound, are turned on.

Figure 3:
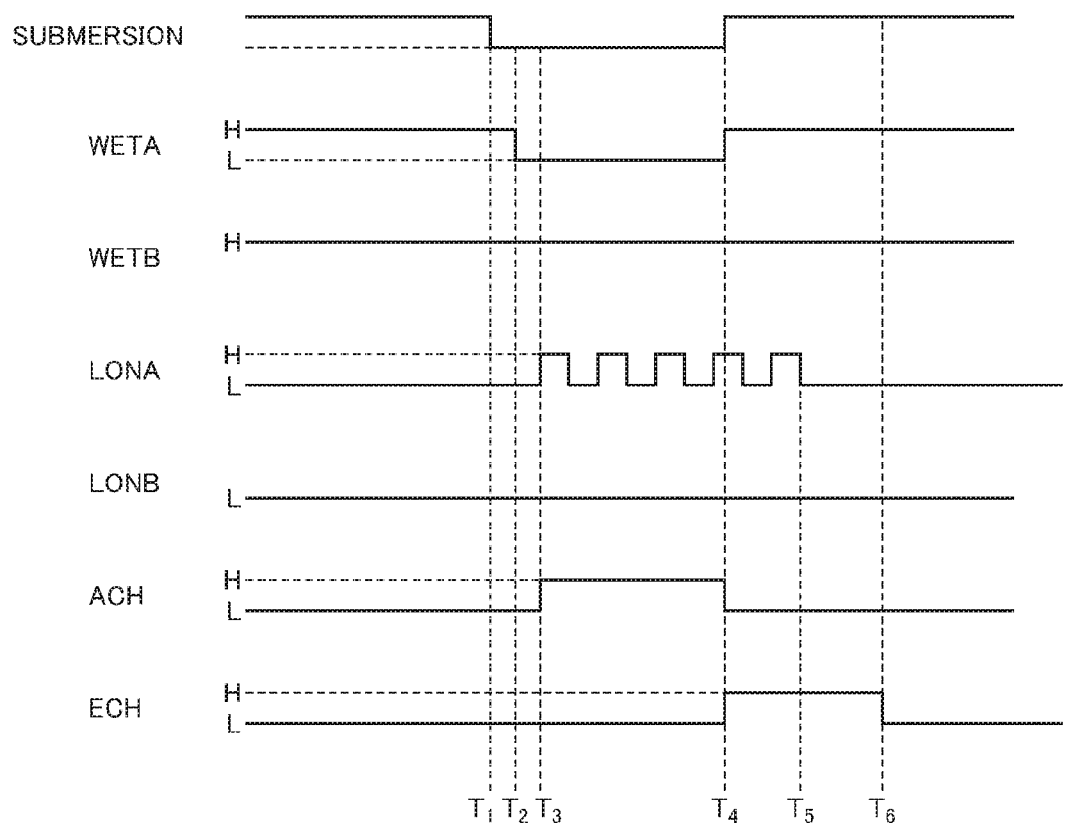
FIG. 3 is a timing chart showing operations of components of the transceiver in a case where the transceiver is powered on when submerged in the first submersion orientation with the front face facing upward.
Figure 7A:
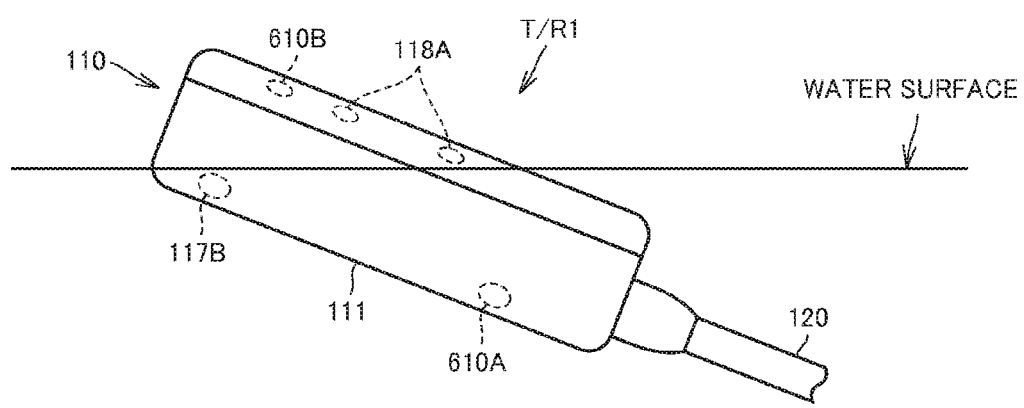
FIGS. 7A and 7B show submersion orientations of the transceiver, where

Case of Submersion in Power-on State and in First Submersion Orientation as Shown in FIG. 7A When the transceiver T/R1 is submerged in the first submersion orientation at T1 shown in FIG. 3, only the first electrodes 610A are submerged and brought into electrical conduction via water, so that the submersion signal WETA from the frontside submersion detector 600A to be received by the controller 200 changes from level H to level L within 10 ms at T2 shown in FIG. 3. In response to the change from level H to level L of the submersion signal WETA, the controller 200 determines that the transceiver T/R1 has been submerged in the first submersion orientation and performs the following operations:

(1) Flashing the Frontside LEDs 118A

At T3 shown in FIG. 3, the illuminants, such as the frontside LEDs 118A, start flashing on and off. For the flashing of the frontside LEDs 118A, the controller 200 switches a lighting signal LONA between level H and L at predetermined intervals, and the signal is input to the frontside lighting circuit 500A. When the lighting signal LONA changes to level H, the frontside lighting circuit 500A lights up the LEDs 118A, and while when the lighting signal LONA changes to level L, the frontside lighting circuit 500A turns off the frontside LEDs 118A. In accordance with alternation of level H and L of the lighting signal LONA repeated at the predetermined intervals, the frontside LEDs 118A flash on and off.

It should be noted that in the first submersion orientation, the second electrodes 610B at the lower part of the frontside of the transceiver T/R1 are not submerged. Accordingly, there is no output of the submersion signal WETB or the lighting signal LONB, so that the backside LED 117B does not light up. This can save power for lighting up the backside LED 117B.

(2) Emitting Alarm Sound

At T3 shown in FIG. 3, emission of the alarm sound is started. To emit the alarm sound, the controller 200 changes the alarm sound generation signal ACH from level L to level H, and the signal is input to the audio part 700. The loudspeaker SP then emits the alarm sound. When water is not completely clogging the inside of the speaker grille 112, the alarm sound is emitted to the outside to reach the user.

At T4 in FIG. 3, when the transceiver T/R1 submerged is retrieved from the water, the first electrodes 610A are no longer submerged nor in electrical conduction with each other, and therefore the submersion signal WETA changes from level L to level H. In response to this, the controller 200 performs the following operations.

(1) Stopping the Alarm Sound

At T4 in FIG. 3, the controller 200 changes the alarm sound generation signal ACH from level H to level L to stop the emission of the alarm sound. At the same time, the controller 200 emits a draining sound. Specifically, the controller 200 changes a draining sound generation signal ECH from level L to level H, and the signal is input to the audio part 700 to emit the draining sound.

(2) Starting Measurements of the Lighting Duration of the Frontside LEDs 118A

At T4 in FIG. 3, the controller 200 starts an LED timer to measure a lighting duration of the frontside LEDs 118A and a draining sound timer to measure a draining sound duration during which the draining sound is emitted. At T5 when the lighting duration has elapsed, i.e. when the time of the LED timer is up, the lighting signal LONA is stopped (i.e. the lighting signal LONA is set to level L), so that the frontside LEDs 118A stop flashing. At T6 when the draining sound duration has elapsed, i.e. when the time of the draining sound timer is up, the draining sound generation signal ECH is stopped (i.e. the draining sound generation signal ECH is set to level L), so that the emission of the draining sound stops.

The draining sound duration may be determined appropriately in accordance with conditions such as the characteristics of the loudspeaker SP, the volume inside the speaker grille 112, and the shape of the transceiver T/R1. The duration is suitably about ten seconds, for example. The draining sound duration may be set by a user as desired.

(3) Returning to the State Immediately Before the Submersion

When the frontside LEDs 118A stop lighting and the emission of the draining sound stops, i.e. at T6 shown in FIG. 3, the user can immediately resume the use of the transceiver T/R1.

Figure 4:
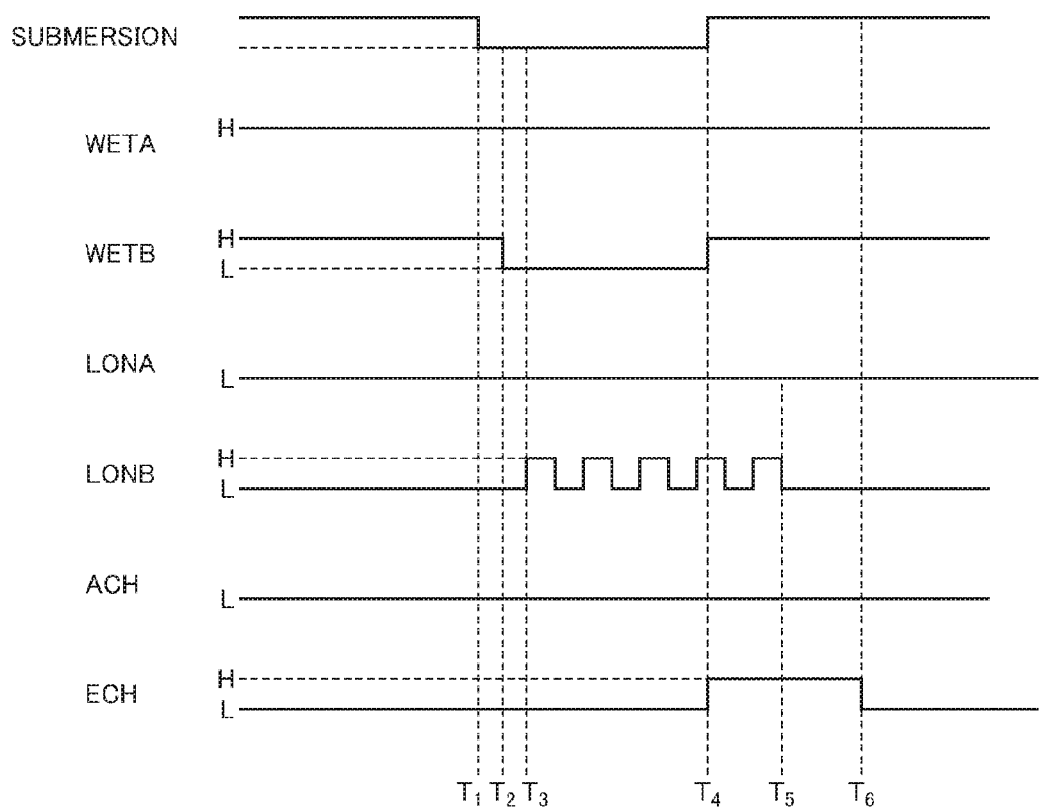
FIG. 4 is a timing chart showing operations of the components in a case where the transceiver is powered on when submerged in the second submersion orientation with the back face facing upward.
Figure 7B:
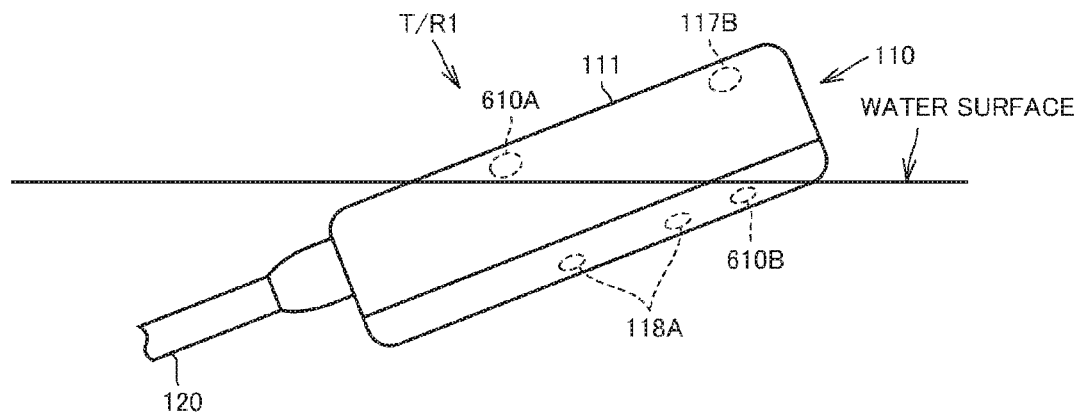

Case of Submersion in Power-on State and in Second Submersion Orientation as Shown in FIG. 7B When the transceiver T/R1 is submerged in the second submersion orientation at T1 shown in FIG. 4, only the second electrodes 610B are submerged and brought into electrical conduction via water, so that the submersion signal WETB from the backside submersion detector 600B to be received by the controller 200 changes from level H to level L within 10 ms at T2 shown in FIG. 4. In response to the change from level H to level L of the submersion signal WETB, the controller 200 determines that the transceiver T/R1 has been submerged in the second submersion orientation and performs the following operations:

(1) Flashing the Backside LED 117B

At T3 shown in FIG. 4, an illuminant, such as the backside LED 117B, starts flashing on and off. For the flashing of the backside LED 117B, the controller 200 switches a lighting signal LONB between level H and L at predetermined intervals, and the signal is input to the backside lighting circuit 500B. When the lighting signal LONB changes to level H, the lighting circuit 500B lights up the backside LED 117B, while when the lighting signal LONB changes to level L, the lighting circuit 500B turns off the backside LED 117B. In accordance with alternation of level H and L of the lighting signal LONB repeated at the predetermined intervals, the backside LED 117B flashes on and off.

It should be noted that in the second submersion orientation, the first electrodes 610A on the backside of the transceiver T/R1 are not submerged. Accordingly, there is no output of the submersion signal WETA or the lighting signal LONA, so that the frontside LEDs 118A do not light up. This can save power for lighting up the frontside LEDs 118A.

It should also be noted that in the second submersion orientation, the speaker grille 112 faces downward, i.e. is located under the water. Accordingly, the controller 200 does not generate an alarm sound generation signal ACH.

At T4 in FIG. 4 when the transceiver T/R1 submerged is retrieved from the water, the second electrodes 610B are no longer submerged nor in electrical conduction with each other, and therefore the submersion signal WETB changes from level L to level H. In response to this, the controller 200 performs the following operations.

(1) Emitting the Draining Sound

At T4 in FIG. 4, the controller 200 changes a draining sound generation signal ECH from level L to level H, and the signal is input to the audio part 700 to emit the draining sound.

(2) Starting Measurements of the Lighting Duration of the Backside LED 117B Etc.

At T4 in FIG. 4, the controller 200 starts the LED timer to measure a lighting duration of the backside LED 117B and the draining sound timer to measure a draining sound duration during which the draining sound is emitted. At T5 when the lighting duration has elapsed, i.e. when the time of the LED timer is up, the lighting signal LONB is stopped (i.e. the lighting signal LONB is set to level L), so that the backside LED 117B stops flashing. At T6 when the draining sound duration has elapsed, i.e. when the time of the draining sound timer is up, the draining sound generation signal ECH is stopped (i.e. the draining sound generation signal ECH is set to level L), so that the emission of the draining sound stops.

The draining sound duration may be determined appropriately in accordance with conditions such as the characteristics of the loudspeaker SP, the volume inside the speaker grille 112, and the shape of the transceiver T/R1. The duration is suitably about ten seconds, for example. The draining sound duration may be set by a user as desired.

(3) Returning to the State Immediately Before the Submersion

When the backside LED 117B stops lighting and the emission of the draining sound stops, i.e. at T6 shown in FIG. 4, the user can immediately resume the use of the transceiver T/R1.

Figure 5:
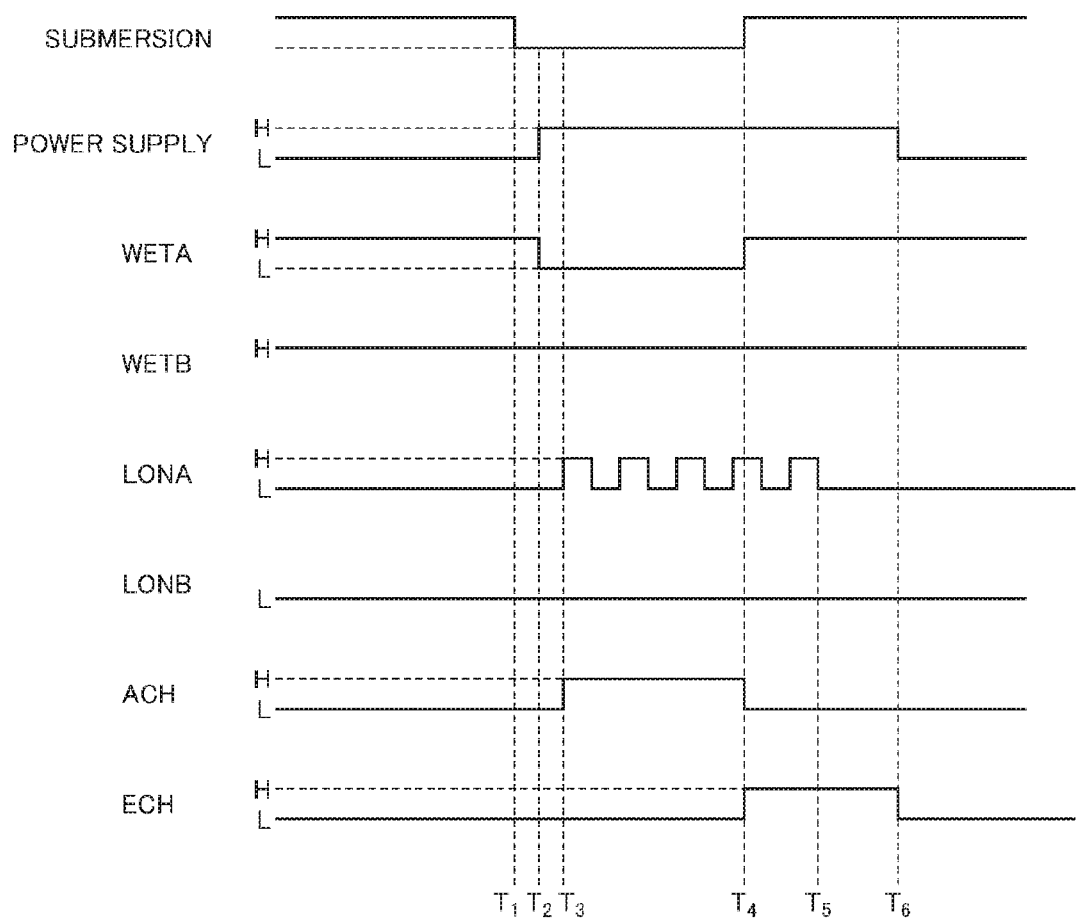
FIG. 5 is a timing chart showing operations of the components in a case where the transceiver is powered off when submerged in the first submersion orientation with the front face facing upward.

Case of Submersion in Power-Off State and in First Submersion Orientation as Shown in FIG. 7A Even in the power-off state, when the transceiver T/R1 is submerged at T1 shown in FIG. 5, only the first electrodes 610A are submerged and brought into conduction with each other via water, so that the submersion signal WETA changes from level H to level L at T2 shown in FIG. 5. This level change causes the output of the OR circuit 330 to change from level L to level H, and power of the battery 310 is supplied to the controller 200 via the power supply circuit 340. Also started at T2 shown in FIG. 5 is power supply to the frontside LEDs 118A, the frontside lighting circuit 500A, and the audio part 700. At T3 shown in FIG. 5, the controller 200 starts to repeat changing the lighting signal LONA between level high and level low, so that the frontside LEDs 118A start to flash on and off. Simultaneously with the flashing of the frontside LEDs 118A, the alarm sound generation signal ACH also changes from level L to level H, so that the alarm sound is emitted.

At T4 in FIG. 5 when the transceiver T/R1 is retrieved from the water, the first electrodes 610A are brought out of conduction, and the submersion signal WETA from the submersion detector 600 to be received by the controller 200 changes from level L to level H. The controller 200 accordingly determines that the transceiver T/R1 has been retrieved from the surface of the water and performs the following operations.

When the submersion signal WETA changes from level L to level H, at T4 shown in FIG. 5, the controller 200 changes the alarm sound generation signal ACH from level H to level L, so that the audio part 700 stops the emission of the alarm sound. The controller 200 instead changes the draining sound generation signal ECH from level L to level H, so that the audio part 700 emits a draining sound. Simultaneously started are the measurements of the lighting duration of the frontside LEDs 118A etc. At T5 shown in FIG. 5 when the lighting duration has elapsed, the frontside LEDs 118A stops flashing. At T6 shown in FIG. 5 when the draining sound duration has elapsed, the draining sound stops. At T6 shown in FIG. 5, the power is also turned off.

Figure 6:
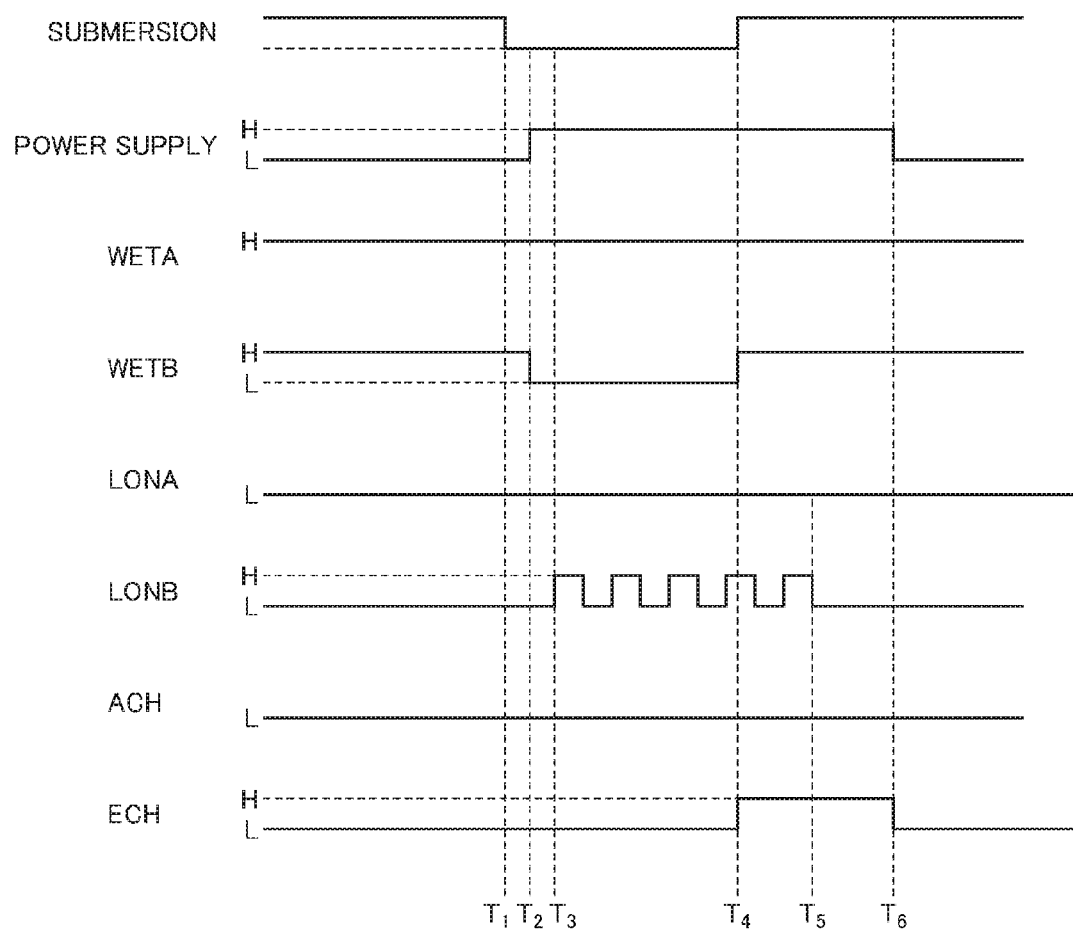
FIG. 6 is a timing chart showing operations of the components in a case where the transceiver is powered off when submerged in the second submersion orientation with the back face facing upward.

Case of Submersion in Power-Off State and in Second Submersion Orientation as Shown in FIG. 7b Even in the power-off state, when the transceiver T/R1 is submerged at T1 shown in FIG. 6, only the second electrodes 610B are submerged and brought into conduction with each other via water, so that the submersion signal WETB changes from level H to level L at T2 shown in FIG. 6. This level change causes the output of the OR circuit 330 to change from level L to level H, and power of the battery 310 is supplied to the controller 200 via the power supply circuit 340. Also started at T2 shown in FIG. 6 is power supply to the backside LED 117B and the backside lighting circuit 500B. At T3 shown in FIG. 6, the controller 200 starts to repeat changing the lighting signal LONB between level high and level low, so that the backside LED 117B starts to flash on and off. Since the transceiver T/R1 is submerged in the orientation with the back face facing upward, there is no output of the alarm sound generation signal ACH or emission of the alarm sound.

At T4 in FIG. 6 when the transceiver T/R1 is retrieved from the water, the second electrodes 610B are brought out of conduction, and the submersion signal WETB from the submersion detector 600 to received by the controller 200 changes from level L to level H. The controller 200 accordingly determines that the transceiver T/R1 has been retrieved from the surface of the water and performs the following operations.

When the submersion signal WETB changes from level L to level H, the controller 200 changes the draining sound generation signal ECH from level L to level H, so that the audio part 700 emits a draining sound. Simultaneously started are the measurements of the lighting duration of the backside LED 117B etc. At T5 shown in FIG. 6 when the lighting duration has elapsed, the backside LED 117B stops flashing. At T6 shown in FIG. 6 when the draining sound duration has elapsed, the draining sound stops. At T6 shown in FIG. 6, the power is also turned off.

Next, a transceiver T/R2 in a second embodiment will be described with reference to FIGS. 8A to 10B. In contrast with the transceiver T/R1 in the first embodiment having two submersion detectors 600A, 600B, the transceiver T/R2 in the second embodiment is provided with a single submersion detector 600. The transceiver T/R2 further includes an orientation sensor 800. The orientation sensor 800 serves as an orientation detector to detect a submersion orientation of the transceiver T/R2. In other words, the submersion detector 600 in the second embodiment is not adapted to detect a submersion orientation of the transceiver T/R2. In the following description, like elements as in the transceiver T/R1 are given the same reference numerals and referred to using the same figures.

The transceiver T/R2 includes the submersion detector 600, frontside LEDs 118A and a backside LED 117B, a frontside lighting circuit 500A and a backside lighting circuit 500B, a controller 200, and the orientation sensor 800. The submersion detector 600 can detect submersion of the transceiver T/R2 itself and detect retrieval thereof. The terms "submersion" and "retrieval" of the transceiver T/R2 are used in the same meaning as those in the first embodiment. The frontside LEDs 118A and the backside LED 117B are illuminants provided in a casing 111. The frontside LEDs 118A and the backside LED 117B are arranged such that at least one of them is visible from above the water when the transceiver is submerged in any submersion orientation. The frontside lighting circuit 500A lights up the frontside LEDs 118A in response to an input of a lighting signal LONA. The backside lighting circuit 500B lights up the backside LED 117B in response to an input of a lighting signal LONB. The controller 200 is configured to generate a lighting signal LONA and output the generated signal LONA to the frontside lighting circuit 500A for a period of time from the submersion until the retrieval, thereby lighting up the frontside LEDs 118A. The controller 200 is also configured to generate a lighting signal LONB and output the generated signal LONB to the backside lighting circuit 500B between the submersion and the retrieval, thereby lighting up the backside LED 117B. The orientation sensor 800 is configured to detect a submersion orientation of the transceiver. Depending on the submersion orientation detected by the orientation sensor 800, only the frontside LEDs 118A or only the backside LED 117B located in a position visible from above the water emits light.

The orientation sensor 800 can detect a submersion orientation of the transceiver T/R2. The orientation sensor 800 may be, for example, an inclination sensor or an acceleration sensor.

The submersion detector 600 has a pair of electrodes 610, which are brought into electrical conduction to each other by establishing a short circuiting via water. The conduction of the first electrodes 610 is used by the controller 200 of the transceiver T/R2 to detect submersion of the transceiver T/R2. Therefore, the electrodes 610 of the submersion detector 600 needs to be provided at places that will always be submerged when the transceiver T/R2 is submerged in any submersion orientation.

For example, if the transceiver T/R2 is designed such that the top face of the body 110 is always submerged due to the weight distribution of the components of the transceiver, irrespective of whether it is submerged with the front face of the body 110 facing upward (first submersion orientation, see FIG. 10A) or with the back face of the body 110 facing upward (second submersion orientation, see FIG. 10B), the electrodes 610 are preferably provided on the top face of the body 110 as shown in FIGS. 8A to 8C.

The transceiver T/R2 in the second embodiment has the same appearance as that of the transceiver T/R1 in the first embodiment, except the electrodes 610 as described above. Specifically, appearance-wise the transceiver T/R2 has the body 110 including the casing 111, and an antenna 120 provided on the top face of the casing 111 to point upward. The antenna 120 is a rod-shaped antenna with a coiled antenna wire accommodated in a plastic pipe. The antenna wire is a copper wire or an iron wire and thus has a weight. The weight of the antenna 120 results in an upward-biased weight distribution of the entire transceiver T/R2.

The front face of the casing 111 is provided with a display 113, a keypad panel 114, and a speaker grille 112, from top to bottom in this order. Provided inside the speaker grille 112 is a loudspeaker SP. Provided on the left side face of the casing 111 is a push-to-talk (PTT) switch 115. On the top face of the casing 111, provided to the left of the antenna 120 is an SP/MIC connector 116 covered with a watertight cap.

The display 113 is a liquid crystal display, and the rear face thereof is provided with LEDs serving as backlights. The display 113 can indicate communication channels, volume, and other various settings.

Disposed on the keypad panel 114 is a plurality of key switches including a power key PS and numeric keys. The power key PS is a key switch to turn the power on/off. When the power key PS is pressed for a predetermined period of time (e.g. for two seconds or longer) by a user, the power of the transceiver T/R2 is switched from on to off or from off to on. The keypad panel 114 is also provided on its rear face with LEDs serving as backlights. The key switches of the keypad panel 114 have transparent or translucent key tops and are illuminated from the back by the lighting-up of the associate backlights. It should be noted that the frontside LEDs 118A are the LEDs serving as backlights for the display 113 and for the key panel 114. The frontside LEDs 118A is also adapted to emit light during submersion.

The electrodes 610 on the top face of the body 110 form part of the submersion detector 600. The transceiver T/R2 is upward-biased in overall weight distribution due to the weight of the antenna 120 and has such an adjusted center of gravity that the transceiver T/R2 floats on water with the upper portion of the casing 111, which is provided with the antenna 120, pointing in a underwater direction. Therefore, the electrodes 610 become always short-circuited and conducted with each other via water irrespective of the submersion orientation of the transceiver T/R2. The conduction of the electrodes 610 is used by the controller 200 of the transceiver T/R2 (see FIG. 9) to detect submersion of the transceiver T/R2.

The backside LED 117B, an illuminant, is disposed in a lower part of the back face of the casing 111.

Figure 9:
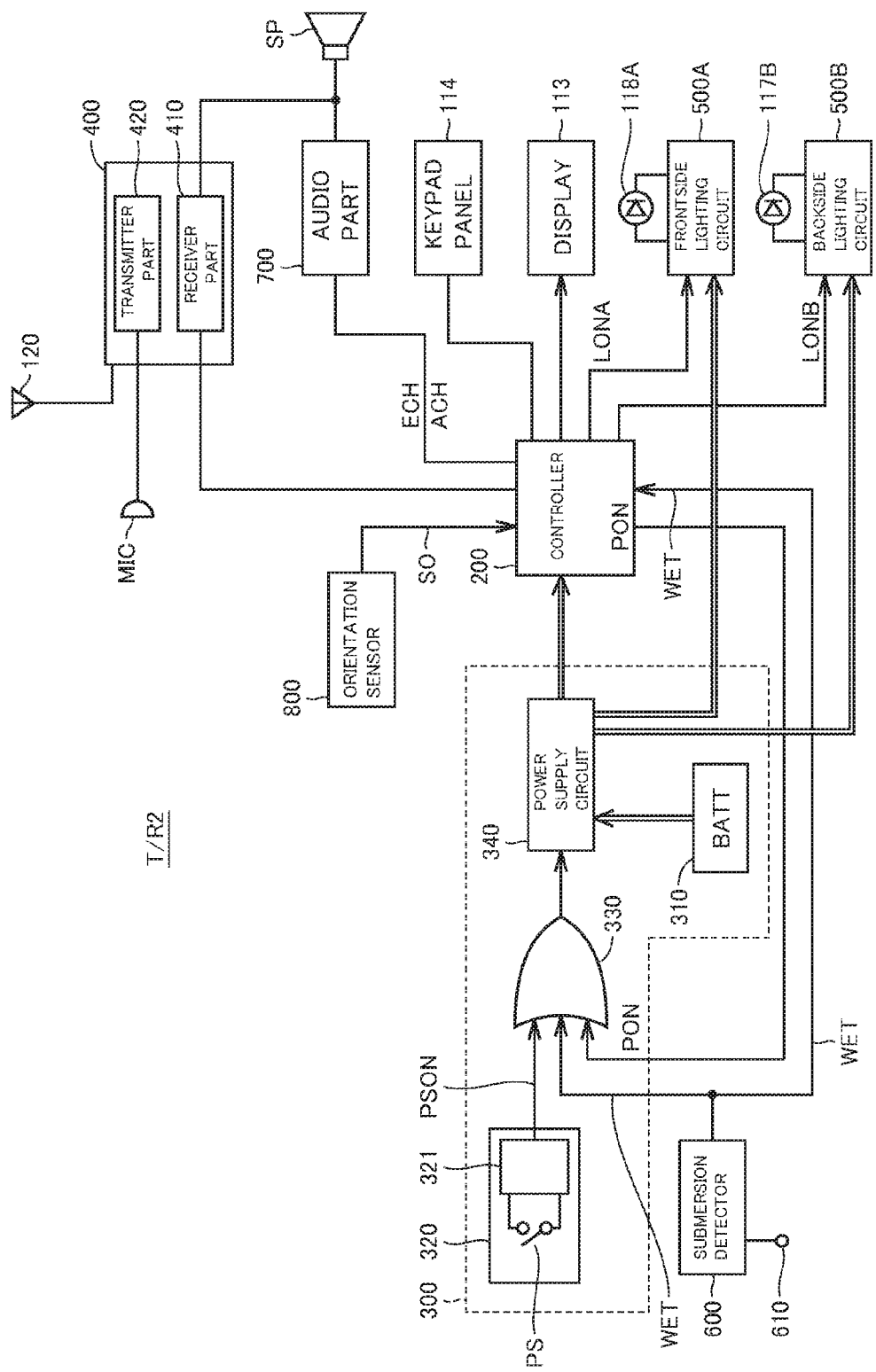
FIG. 9 is a block diagram showing a configuration of the transceiver.

Referring to the block diagram shown in FIG. 9, a circuit configuration of the transceiver T/R2 will be described. This figure shows some circuits of the transceiver T/R2, particularly circuits related to power control, audio signal processing, and communication control.

The transceiver T/R2 includes the controller 200, the power controller 300, the communication unit 400 including a receiver part 410 and a transmitter part 420, the frontside lighting circuit 500A, the backside lighting circuit 500B, the submersion detector 600, the audio part 700, and the orientation sensor 800.

The controller 200 is a so-called microcontroller provided with memory, various interfaces, A/D and D/A converters, etc. in addition to a CPU. The controller 200 controls an entire operation of the transceiver T/R2, including setting operations as shown in the timing charts in FIGS. 3 to 6. The controller 200 is also connected to the display 113 and the keypad panel 114. The controller 200 stores, in its memory, a control program for controlling the operation of the transceiver T/R2.

The power controller 300 includes a battery 310 and controls supply of power to the controller 200, the communication unit 400, the two lighting circuits, namely the frontside lighting circuit 500A and the backside lighting circuit 500B, and the display 113.

The receiver part 410 of the communication unit 400 is a circuit to process reception of high-frequency signals and emission of audio signals. The loudspeaker SP is connected to the final stage of the receiver part 410. The loudspeaker SP is shared by the receiver part 410 and the audio part 700. The transmitter part 420 of the communication part 400 is a circuit to convert audio signals from a microphone MIC into transmission signals of high-frequency and transmit them through the antenna 120.

The frontside lighting circuit 500A is a circuit to light the frontside LEDs 118A (illuminants) in response to the lighting signal LONA from the controller 200. The backside lighting circuit 500B is a circuit to light the backside LED 117B (illuminant) in response to the lighting signal LONB from the controller 200.

As described above, the frontside LEDs 118A act as backlights of the display 113 and the key panel 114 and also as illuminants that light up to inform the location of the transceiver T/R2 when it is submerged. FIGS. 8A to 8C show two frontside LEDs 118A as backlights of the display, nine frontside LEDs 118A as backlights of the key panel 114, and one backside LED 117B. However, the LEDs 118A may be of any number and luminance required to illuminate the display 113 and the keypad panel 114 in their entirety from the back.

The power controller 300 includes, in addition to the battery 310, a power switching circuit 320, an OR circuit 330, and a power supply circuit 340. The battery 310 may be e.g. a lithium ion battery, with voltage of e.g. 7.4 V. The power switching circuit 320 has the above-described power key PS and a hold circuit 321. The hold circuit 321 can output a power switch-on signal PS ON. The hold circuit 321 reverses the state (level high "H" or low "L") of the power switch-on signal PSON when the power key PS is kept activated for the predetermined period of time or longer. The power switch-on signal PSON will be input to the OR circuit 330.

The submersion detector 600 includes the above-described pair of electrodes 610. When the pair of electrodes 610 are submerged and brought into electrical conduction with each other via water, a submersion signal WET is lowered to level L. The submersion signal WET is input to the OR circuit 330 of the power controller 300 and the controller 200. The OR circuit 330 is configured to receive, in addition to the power switch-on signal PSON and the submersion signal WET, a power maintaining signal PON from the controller 200.

The orientation sensor 800 outputs an orientation signal SO to the controller 200. The controller 200 detects the orientation of the transceiver T/R2 based on the orientation signal SO.

An output from the OR circuit 330 is input into the power supply circuit 340. When receiving a "high" (H) signal from the OR circuit 330, the power supply circuit 340 supplies power of the battery 310 to the controller 200, the communication part 400, the frontside lighting circuit 500A, and the backside lighting circuit 500B so as to power on the transceiver T/R2.

The lighting circuit 500A is configured to light illuminants, such as the frontside LEDs 118A, in response to a lighting signal LONA at a "high" level (level H) input from the controller 200, i.e. in response to an input of an H signal of a lighting signal LONA. When the controller 200 maintains a lighting signal LONA at level H, the frontside LEDs 118A remains illuminated. When the controller 200 periodically switches a lighting signal LONA between level H and level L, the frontside LEDs 118A flash on and off. When a user turns on the backlights via the keypad panel 114, the controller 200 raises the lighting signal LONA to level H to light up the frontside LEDs 118A.

The backside lighting circuit 500B is also configured to light an illuminant, such as the backside LED 117B in response to a lighting signal LONB at a level H from the controller 200, i.e. in response to an H signal of a lighting signal LONB. When the controller 200 maintains a lighting signal LONB at level H, the backside LED 117B remains illuminated. When the controller 200 periodically switches a lighting signal LONB between level H and level L, the backside LED 117B flash on and off.

It is preferable that the frontside LEDs 118A and the backside LED 117B flash on and off, rather than simply light up, during submersion for the purpose of easy finding of the transceiver T/R2 submerged.

When the transceiver T/R2 is submerged in the first submersion orientation (see FIG. 10A), to cause the submersion signal WET from the submersion detector 600 to change from level H to level L, the controller 200 detects that the transceiver T/R2 is in the first submersion orientation based on the orientation signal SO (first orientation signal) and changes the lighting signal LONA between level H and L at predetermined flashing intervals to flash the frontside LEDs 118A on and off. When the transceiver T/R2 is retrieved and the submersion signal WET from the submersion detector 600 changes from level L to level H, the controller 200 continues to flash the frontside LEDs 118A on and off for a predetermined lighting duration. It should be noted that the flashing intervals of the frontside LEDs 118A during submersion and the lighting duration after retrieval may be set by a user as desired.

When the transceiver T/R2 is submerged in the second submersion orientation (see FIG. 10B) to cause the submersion signal WET from the submersion detector 600 to change from level H to level L, the controller 200 detects that the transceiver T/R2 is in the second submersion orientation based on the orientation signal SO (second orientation signal) and changes the lighting signal LONB between level H and L at predetermined flashing intervals to flash the backside LED 117B on and off. When the transceiver T/R2 is retrieved and the submersion signal WET from the submersion detector 600 changes from level L to level H, the controller 200 continues to flash the backside LED 117B on and off for a predetermined lighting duration. It should be noted that the flashing intervals of the backside LED 117B during submersion and the lighting duration after retrieval can be set by a user as desired.

The audio part 700 is configured to emit an alarm sound upon receiving an alarm sound generation signal ACH, which is generated by and output from the controller 200 when the submersion signal WET from the submersion detector 600 changes from level H to level L and the controller 200 detects that the transceiver T/R2 is in the first submersion orientation based on the orientation signal SO (first orientation signal). The alarm sound is an intermittently emitted sound generated when the transceiver T/R1 is submerged. The alarm sound may be a sinusoidal wave of about 1 kHz, which can be easily recognized by human hearing. The alarm sound may be at a maximum level or may be set to an appropriate level to inform a user of the location with reduced exhaustion of the battery 310.

In a case where the submersion signal WET from the submersion detector 600 changes from level H to level L but the controller 200 detects that the transceiver T/R2 is in the second submersion orientation based on the orientation signal SO (second orientation signal), the speaker grille 112 faces downward, i.e., the speaker grille 12 is under water. Therefore, the controller 200 does not generate an alarm sound generation signal ACH in this case.

The draining sound is generated during a draining operation of the speaker grille and may be a rectangular wave of 300 Hz. The frequency and the waveform of the draining sound can be determined appropriately in accordance with the characteristics of the loudspeaker SP, the volume of the speaker grille 112, the shape of the transceiver T/R2, and other conditions. It is preferable to use a rectangular wave or a sawtooth wave between 100 Hz and 500 Hz.

The controller 200 is activated by being supplied with power voltage from the power controller 300, and configured to control the operation of the transceiver T/R2. The controller 200, in particular, can monitor input change of the submersion signal WET from the submersion detector 600 at predetermined time intervals, milliseconds (ms), and executes operations below. The following describes the operations in a case where both submersion notification operations, i.e. the flashing of the frontside LEDs 118A and the backside LED 117B and the emission of the alarm sound, are turned on.

Figure 10A:
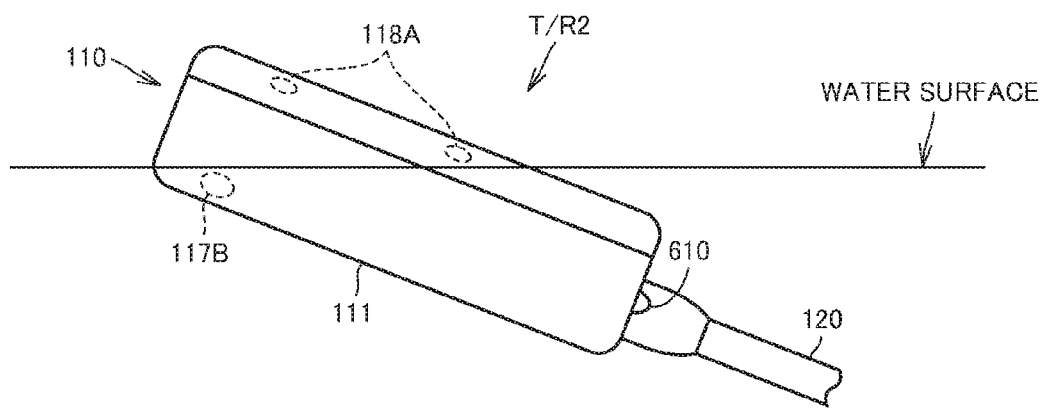
FIGS. 10A and 10B show submersion orientations of the transceiver, where

Case of Submersion in Power-on State and in First Submersion Orientation as Shown in FIG. 10A

When the transceiver T/R2 is submerged in the first submersion orientation, the electrodes 610 are submerged and brought into electrical conduction via water, so that the submersion signal WET from the submersion detector 600A to be received by the controller 200 changes from level H to level L within 10 ms. In response to the change from level H to level L of the submersion signal WET and the orientation signal SO (first orientation signal) from the orientation sensor 800, the controller 200 determines that the transceiver T/R2 has been submerged in the first submersion orientation and performs the following operations:

(1) Flashing the Frontside LEDs 118A

The illuminants, such as the frontside LEDs 118A, start flashing on and off. For the flashing of the frontside LEDs 118A, the controller 200 switches a lighting signal LONA between level H and L at predetermined intervals, and the signal is input to the frontside lighting circuit 500A. When the lighting signal LONA changes to level H, the frontside lighting circuit 500A lights up the LEDs 118A, and while when the lighting signal LONA changes to level L, the frontside lighting circuit 500A turns off the frontside LEDs 118A. In accordance with alternation of level H and L of the lighting signal LONA repeated at the predetermined intervals, the frontside LEDs 118A flash on and off.

It should be noted that in the first submersion orientation, there is no output of the lighting signal LONB, so that the backside LED 117B does not light up. This can save power for lighting up the backside LED 117B.

(2) Emitting Alarm Sound.

Emission of the alarm sound is started. To emit the alarm sound, the controller 200 changes the alarm sound generation signal ACH from level L to level H, and the signal is input to the audio part 700. The loudspeaker SP then emits the alarm sound. When water is not completely clogging the inside of the speaker grille 112, the alarm sound is emitted to the outside to reach the user.

When the transceiver T/R2 submerged is retrieved from the water, the first electrodes 610A are no longer submerged nor in electrical conduction with each other, and therefore the submersion signal WET changes from level L to level H. In response to this, the controller 200 performs the following operations.

(1) Stopping the Alarm Sound.

The controller 200 changes the alarm sound generation signal ACH from level H to level L to stop the emission of the alarm sound. At the same time, the controller 200 emits a draining sound. Specifically, the controller 200 changes a draining sound generation signal ECH from level L to level H, and the signal is input to the audio part 700 to emit the draining sound.

(2) Starting Measurements of the Lighting Duration of the Frontside LEDs 118A and the Like.

The controller 200 starts an LED timer to measure a lighting duration of the frontside LEDs 118A and a draining sound timer to measure a draining sound duration during which the draining sound is emitted. When the lighting duration has elapsed, i.e. when the time of the LED timer is up, the lighting signal LONA is stopped (i.e. the lighting signal LONA is set to level L), so that the frontside LEDs 118A stop flashing. When the draining sound duration has elapsed, i.e. when the time of the draining sound timer is up, the draining sound generation signal ECH is stopped (i.e. the draining sound generation signal ECH is set to level L), so that the emission of the draining sound stops.

The draining sound duration may be determined appropriately in accordance with conditions such as the characteristics of the loudspeaker SP, the volume inside the speaker grille 112, and the shape of the transceiver T/R2. The duration is suitably about ten seconds, for example. The draining sound duration may be set by a user as desired.

(3) Returning to the State Immediately Before the Submersion

When the frontside LEDs 118A stop lighting and the emission of the draining sound stops, the user can immediately resume the use of the transceiver T/R2.

Figure 10B:
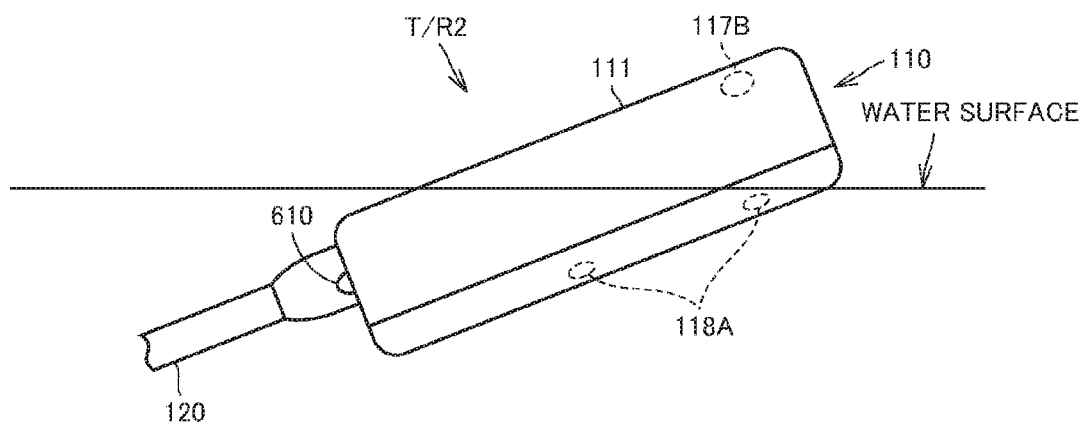

Case of Submersion in Power-on State and in Second Submersion Orientation as Shown in FIG. 10B When the transceiver T/R2 is submerged in the second submersion orientation, the second electrodes 610B are submerged and brought into electrical conduction via water, so that the submersion signal WET from the submersion detector 600 to be received by the controller 200 changes from level H to level L within 10 ms. In response to the change from level H to level L of the submersion signal WET and the orientation signal SO (second orientation signal) from the orientation sensor 800, the controller 200 determines that the transceiver T/R2 has been submerged in the second submersion orientation and performs the following operations:

(1) Flashing the Backside LED 117B

An illuminant, such as the backside LED 117B, starts flashing on and off. For the flashing of the backside LED 117B, the controller 200 switches a lighting signal LONB between level H and L at predetermined intervals, and the signal is input to the backside lighting circuit 500B. When the lighting signal LONB changes to level H, the lighting circuit 500B lights up the backside LED 117B, while when the lighting signal LONB changes to level L, the lighting circuit 500B turns off the backside LED 117B. In accordance with alternation of level H and L of the lighting signal LONB repeated at the predetermined intervals, the backside LED 117B flashes on and off.

It should be noted that in the second submersion orientation, there is no output of the lighting signal LONA, so that the frontside LEDs 118A do not light up. This can save power for lighting up the frontside LEDs 118A.

In the second submersion orientation, the speaker grille 112 faces downward, i.e., is located under the water. Accordingly, the controller 200 does not generate an alarm sound generation signal ACH.

When the transceiver T/R2 submerged is retrieved from the water, the second electrodes 610B are no longer submerged nor in electrical conduction with each other, and therefore the submersion signal WET changes from level L to level H. In response to this, the controller 200 performs the following operations.

(1) Emitting the Draining Sound

The controller 200 changes a draining sound generation signal ECH from level L to level H, and the signal is input to the audio part 700 to emit the draining sound.

(2) Starting Measurements of the Lighting Duration of the Backside LED 117B and the Like.

The controller 200 starts the LED timer to measure a lighting duration of the backside LED 117B and the draining sound timer to measure a draining sound duration during which the draining sound is emitted. When the lighting duration has elapsed, i.e. when the time of the LED timer is up, the lighting signal LONB is stopped (i.e. the lighting signal LONB is set to level L), so that the backside LED 117B stops flashing. When the draining sound duration has elapsed, i.e. when the time of the draining sound timer is up, the draining sound generation signal ECH is stopped (i.e. the draining sound generation signal ECH is set to level L), so that the emission of the draining sound stops.

The draining sound duration may be determined appropriately in accordance with conditions such as the characteristics of the loudspeaker SP, the volume inside the speaker grille 112, and the shape of the transceiver T/R2. The duration is suitably about ten seconds, for example. The draining sound duration may be set by a user as desired.

(3) Returning to the State Immediately Before the Submersion

When the backside LED 117B stops lighting and the emission of the draining sound stops, the user can immediately resume the use of the transceiver T/R2.

Case of Submersion in Power-Off State and in First Submersion Orientation as Shown in FIG. 10A Even in the power-off state, when the transceiver T/R2 is submerged, the electrodes 610 are submerged and brought into conduction with each other via water, so that the submersion signal WET changes from level H to level L. This level change causes the output of the OR circuit 330 to change from level L to level H, and power of the battery 310 is supplied to the controller 200 via the power supply circuit 340. Also started is power supply to the frontside LEDs 118A, the frontside lighting circuit 500A, and the audio part 700. In response to the change from level H to level L of the submersion signal WET and the orientation signal SO (first orientation signal) from the orientation sensor 800, the controller 200 determines that the transceiver T/R2 has been submerged in the first submersion orientation and outputs the lighting signal LONA to flash the frontside LEDs 118A on and off. The controller 200 starts to repeat changing the lighting signal LONA between level high and level low, so that the frontside LEDs 118A start to flash on and off. Simultaneously with the flashing of the frontside LEDs 118A, the alarm sound generation signal ACH also changes from level L to level H, so that the alarm sound is emitted.

When the transceiver T/R2 is retrieved from the water, the electrodes 610 are brought out of conduction, and the submersion signal WET from the submersion detector 600 to be received by the controller 200 changes from level L to level H. The controller 200 accordingly determines that the transceiver T/R2 has been retrieved from the surface of the water and performs the following operations.

When the submersion signal WET changes from level L to level H, the controller 200 changes the alarm sound generation signal ACH from level H to level L to stop the emission of the alarm sound. The controller 200 instead changes the draining sound generation signal ECH from level L to level H to emit a draining sound. Simultaneously started are the measurements of the lighting duration of the frontside LEDs 118A etc. When the lighting duration has elapsed, the frontside LEDs 118A stops flashing. When the draining sound duration has elapsed, the draining sound stops. At the instant when the frontside LEDs 118A stop flashing and the draining sound stops, the power is also turned off.

Case of Submersion in Power-Off State and in First Submersion Orientation as Shown in FIG. 10B Even in the power-off state, when the transceiver T/R2 is submerged, the electrodes 610 are submerged and brought into conduction with each other via water, so that the submersion signal WET changes from level H to level L. This level change causes the output of the OR circuit 330 to change from level L to level H, and power of the battery 310 is supplied to the controller 200 via the power supply circuit 340. In response to the change from level H to level L of the submersion signal WET and the orientation signal SO (second orientation signal) from the orientation sensor 800, the controller 200 determines that the transceiver T/R2 has been submerged in the second submersion orientation and outputs the lighting signal LONB to flash the backside LED 117B on and off. Power supply starts to start to repeat changing the lighting signal LONB between level high and level low, so that the backside LED 117B start to flash on and off. Since the transceiver T/R2 is submerged in the orientation with the back face facing upward, there is no output of the alarm sound generation signal ACH or emission of the alarm sound.

When the transceiver T/R2 is retrieved from the water, the electrodes 610 are brought out of conduction, and the submersion signal WET from the submersion detector 600 to received by the controller 200 changes from level L to level H. The controller 200 accordingly determines that the transceiver T/R2 has been retrieved from the surface of the water and performs the following operations.

When the submersion signal WET changes from level L to level H, the controller 200 changes the draining sound generation signal ECH from level L to level H to emit a draining sound. Simultaneously started are the measurements of the lighting duration of the backside LED 117B etc. When the lighting duration has elapsed, the backside LED 117B stops flashing. When the draining sound duration has elapsed, the draining sound stops. At the instant when the backside LED 117B stops flashing and the draining sound stops, the power is also turned off.

In the above-described two embodiments, the frontside LEDs 118A are provided utilizing the LEDs used as the backlight set for the display 113 and the LEDs used as the backlight set for the keypad panel 114, but the invention is not limited to this. It is obviously possible to use only one of the LED sets to inform the user of submersion of the transceiver, or to provide a dedicated separate illuminant to inform the user of submersion of the transceiver.

The lighting operation of the illuminants, i.e. the frontside LEDs 118A or the backside LED 117B, and the emission operation of the alarm sound are performed simultaneously in the above embodiments. Alternatively, only one of these operations may be performed. A user may choose which operation to perform.

The transceiver T/R1, TR2 in the above embodiment emits a draining sound after retrieval. It is obviously possible to configure the transceiver T/R1, TR2 such as to emit no draining sound.

The electronic device in the above embodiments is a hand-held transceiver for marine communication. The electronic device of the invention may be a stationary transceiver, a mobile phone or radio receiver commonly available, or a personal computer, or the like.

The audio part 700 is provided in the above embodiment for emitting the alarm sound and the draining sound. The audio part 700 may also be omitted, in which case a substitute for the audio part 700 may be a latter part of the receiver part 410 of the communication part 400, specifically, an amplification unit or the like to emit sound in response to the alarm sound generation signal ACH and/or the draining sound generation signal ECH from the controller 200. The electronic device of the invention is not limited to being submerged only either one of the first and second submersion orientations. In other words, the electronic device may be configured to be submerged in one of three or more possible submersion orientations.

The present invention can include any combination of these various features or embodiments above and/or below as set-forth in sentences and/or paragraphs. Any combination of disclosed features herein is considered part of the present invention and no limitation is intended with respect to combinable features.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

REFERENCE SIGNS LIST

111: casing
117B: backside LED (illuminant)
118A: frontside LED (illuminant)
200: controller
500A: frontside lighting circuit
500B: backside lighting circuit
600A: frontside submersion detector
600B: backside submersion detector
LONA: lighting signal
LONB: lighting signal

What is claimed is:

1. An electronic device comprising:
a submersion detector configured to detect submersion of the electronic device and detect retrieval of the electronic device, wherein the submersion means that the electronic device itself falls onto a surface of water or into water, and the retrieval means that the electronic device itself is retrieved from the surface of the water or from under the water;
a plurality of illuminants provided inside a casing and arranged such that at least one of the illuminants is visible from above water when the electronic device is submerged in any submersion orientation;
a lighting circuit configured to light up the at least one of the illuminants in response to an input of a lighting signal;
a controller configured to generate and output the lighting signal to the lighting circuit for a period of time from the submersion at least until the retrieval so as to light up the at least one of the illuminants; and
an orientation detector configured to detect a submersion orientation of the electronic device,
wherein only the at least one of the illuminants that is visible from above water lights up, in accordance with the submersion orientation of the electronic device detected by the orientation detector.

2. The electronic device according to claim 1, wherein
the submersion detector comprises a plurality of submersion detectors arranged such that at least one of the submersion detectors is submerged when the electronic device is submerged in any submersion orientation, and the submersion detectors also serving as the orientation detector, and
the at least one of the submersion detectors to be submerged in each submersion orientation corresponds to the at least one illuminant visible from above water in the submersion orientation.

3. The electronic device according to claim 1, wherein
the orientation detector is an orientation sensor configured to detect a submersion orientation of the electronic device and transmit an orientation signal in accordance with the submersion orientation of the electronic device, and
the illuminants are configured such that only the at least one of the illuminants that is visible from above water lights up, in response to the orientation signal from the orientation sensor when the submersion detector detects submersion of the electronic device.

4. The electronic device according to claim 1, wherein
the submersion detector comprises a plurality of submersion detectors including a first submersion detector and a second submersion detector,
the first submersion detector is configured to be submerged and detect that the electronic device is submerged in a first submersion orientation when the electronic device is submerged in the first submersion orientation,
the first submersion detector is also configured to detect that the electronic device submerged in the first submersion orientation has been retrieved when the first submersion detector is no longer submerged,
the second submersion detector is configured to be submerged and detect that the electronic device is submerged in a second submersion orientation when the electronic device is submerged in the second submersion orientation, the second submersion orientation being different from the first submersion orientation, and
the second submersion detector is also configured to detect that the electronic device submerged in the second submersion orientation has been retrieved when the second submersion detector is no longer submerged.

5. An electronic device comprising:
a submersion detector configured to detect submersion of the electronic device and detect retrieval of the electronic device, wherein the submersion means that the electronic device itself falls onto a surface of water or into water, and the retrieval means that the electronic device itself is retrieved from the surface of the water or from under the water;
an orientation detector configured to detect a plurality of submersion orientations of the electronic device;
a plurality of illuminants, at least one of the illuminants corresponding to one of the submersion orientations to be detected by the orientation detector and being disposed in the electronic device such as to be visible from above a surface of water when the electronic device is submerged in the corresponding submersion orientation;
a lighting circuit; and
a controller configured to operate the lighting circuit to light up the at least one of the illuminants for a period of time from detection of the submersion of the electronic device at least to detection of the retrieval of the electronic device by the submersion detector, wherein the at least one of the illuminants corresponds to the submersion orientation of the electronic device detected by the orientation detector.

6. The electronic device according to claim 5, wherein
the at least one lighting circuit comprises a plurality of lighting circuits, and
the controller is configured to operate the one of the lighting circuits to light up the at least one of the illuminants for the period of time from the detection of the submersion of the electronic device at least to the detection of the retrieval of the electronic device by the submersion detector, wherein the one of the lighting circuits and the at least one of the illuminants corresponds to the submersion orientation of the electronic device detected by the orientation detector.

7. The electronic device according to claim 5, wherein
the submersion detector comprises a plurality of submersion detectors including a first and a second submersion detectors, the first and second submersion detectors serving also as the orientation detector, the first submersion detector includes a pair of first electrodes configured such that:

(1) the first electrodes are submerged and brought into electrical conduction with each other when the electronic device is submerged in a first submersion orientation, and (2) the first electrodes are no longer submerged nor in electrical conduction with each other when the electronic device submerged in the first submersion orientation has been retrieved, and the second submersion detector includes a pair of second electrodes configured such that:

(1) the second electrodes are submerged and brought into electrical conduction with each other when the electronic device is submerged in a second submersion orientation, the second submersion orientation being different from the first submersion orientation, and (2) the second electrodes are no longer submerged nor electrically conducted with each other when the electronic device submerged in the second submersion orientation has been retrieved.

8. The electronic device according to claim 7, wherein the illuminants includes:

at least one first illuminant disposed in the electronic device such as to be visible from above a surface of water when the electronic device is submerged in the first submersion orientation, and at least one second illuminant disposed in the electronic device such as to be visible from above a surface of water when the electronic device is submerged in the second submersion orientation, the controller is configured to operate the lighting circuit to light up the at least one first illuminant for a period of time from the detection of the electrical conduction between the first electrodes at least to the detection that the first electrodes are no longer electrically conducted with each other, and the controller is also configured to operate the lighting circuit to light up the at least one second illuminant for a period of time from the detection of the electrical conduction between the second electrodes at least to the detection that the second electrodes are no longer electrically conducted with each other.

9. The electronic device according to claim 7, wherein the illuminants includes:

at least one first illuminant disposed in the electronic device such as to be visible from above a surface of water when the electronic device is submerged in the first submersion orientation, and at least one second illuminant disposed in the electronic device such as to be visible from above a surface of water when the electronic device is submerged in the second submersion orientation, the lighting circuit comprises a first lighting circuit and a second lighting circuit, the controller is configured to operate the first lighting circuit to light up the at least one first illuminant for a period of time from the detection of the electrical conduction between the first electrodes at least to the detection that the first electrodes are no longer electrically conducted with each other, and the controller is also configured to operate the second lighting circuit to light up the at least one second illuminant for a period of time from the detection of the electrical conduction between the second electrodes at least to the detection that the second electrodes are no longer electrically conducted with each other.

10. The electronic device according to claim 5, wherein the submersion detector includes a pair of electrodes configured such that:

(1) the electrodes are submerged and brought into electrical conduction with each other when the electronic device is submerged, and (2) the electrodes are no longer submerged nor in electrical conduction with each other when the electronic device submerged has been retrieved, and the orientation detector is an orientation sensor configured to send orientation signals in accordance with the submersion orientations of the electronic device.

11. The electronic device according to claim 5, wherein the submersion detector includes a pair of electrodes configured such that:

(1) the electrodes are submerged and brought into electrical conduction with each other when the electronic device is submerged, and (2) the electrodes are no longer submerged nor in electrical conduction with each other when the electronic device submerged has been retrieved, the orientation detector is an orientation sensor configured to send first and second orientation signals in accordance with first and second submersion orientations, respectively, of the electronic device, the illuminants includes:

at least one first illuminant disposed in the electronic device such as to be visible from above a surface of water when the electronic device is submerged in the first submersion orientation, and at least one second illuminant disposed in the electronic device such as to be visible from above a surface of water when the electronic device is submerged in the second submersion orientation, the controller is configured to operate the lighting circuit to light up the at least one first illuminant when the electrodes of the submersion detector are brought into electrical conduction with each other and the first orientation signal from the orientation sensor is input to the controller, and the controller is configured to operate the lighting circuit to light up the at least one second illuminant when the electrodes of the submersion detector are brought into electrical conduction with each other and the second orientation signal from the orientation sensor is input to the controller.

12. The electronic device according to claim 5, wherein the submersion detector includes a pair of electrodes configured such that:

(1) the electrodes are submerged and brought into electrical conduction with each other when the electronic device is submerged, and (2) the electrodes are no longer submerged nor in electrical conduction with each other when the electronic device submerged has been retrieved, the orientation detector is an orientation sensor configured to send first and second orientation signals in accordance with first and second submersion orientations, respectively, of the electronic device, the illuminants includes:

at least one first illuminant disposed in the electronic device such as to be visible from above a surface of water when the electronic device is submerged in the first submersion orientation, and at least one second illuminant disposed in the electronic device such as to be visible from above a surface of water when the electronic device is submerged in the second submersion orientation, the lighting circuit comprises a first lighting circuit and a second lighting circuit, the controller is configured to operate the first lighting circuit to light up the at least one first illuminant when the electrodes of the submersion detector are brought into electrical conduction with each other and the first orientation signal from the orientation sensor is input to the controller, and the controller is configured to operate the second lighting circuit to light up the at least one second illuminant when the electrodes of the submersion detector are brought into electrical conduction with each other and the second orientation signal from the orientation sensor is input to the controller.

13. A method of controlling an electronic device, comprising:

operating a submersion detector to detect submersion of the electronic device and to detect retrieval of the electronic device;

operating an orientation detector to detect a submersion orientation of the electronic device; and operating a controller to send a lighting circuit a lighting signal to light up at least one of illuminants provided in a casing for a period of time from the submersion of the electronic device at least to the retrieval of the electronic device, wherein the operating of the controller to send the lighting signal includes operating the controller to send, in accordance with the detected submersion orientation of the electronic device, to the lighting circuit a lighting signal to light up only the at least one of the illuminants that is visible from above a surface of water in the submersion orientation.

14. The method according to claim 13, wherein the illuminants correspond to a plurality of submersion orientations and arranged in the casing such that at least one of the illuminants is visible from above a surface of water when the electronic device is submerged in a corresponding one of submersion orientations, the lighting circuit comprises a plurality of lighting circuits, one of the lighting circuits corresponding to the at least one of the illuminants, and the operating of the controller to send the lighting signal includes operating the controller to send the one of the lighting circuits one of the lighting signals to light up only the at least one of the illuminants corresponding to the detected submersion orientation of the electronic device.

15. The method according to claim 13, wherein the submersion detector comprises a plurality of submersion detectors including a first and a second submersion detectors, the first and second submersion detectors serving also as the orientation detector, and the operating of the submersion detector to detect submersion of the electronic device includes:

operating the submersion detector to detect that first electrodes of the first submersion detector are submerged and brought into electrical conduction with each other when the electronic device is submerged in a first submersion orientation, and operating the submersion detector to detect that second electrodes of the second submersion detector are submerged and brought into electrical conduction with each other when the electronic device is submerged in a second submersion orientation.

16. The method according to claim 15, wherein the operating of the submersion detector to detect the retrieval of the electronic device includes:

operating the submersion detector to detect that the first electrodes of the first submersion detector are no longer submerged nor in electrical conduction with each other when the electronic device submerged in the first submersion orientation has been retrieved, and operating the submersion detector to detect that the second electrodes of the second submersion detector are no longer submerged nor electrically conducted with each other when the electronic device submerged in the second submersion orientation has been retrieved.

17. The method according to claim 16, wherein the illuminants includes:

at least one first illuminant disposed in the electronic device such as to be visible from above a surface of water when the electronic device is submerged in the first submersion orientation, and at least one second illuminant disposed in the electronic device such as to be visible from above a surface of water when the electronic device is submerged in the second submersion orientation, and the operating of the controller to send the lighting signal includes:

operating the controller to send to the lighting circuit the lighting signal to light up the at least one of the illuminants for a period of time from the detection that the first electrodes are electrically conducted with each other at least to the detection that the first electrodes are no longer electrically conducted with each other, and operating the controller to send to the lighting circuit to light up the at least one second illuminant for a period of time from the detection that the second electrodes are electrically conducted with each other at least to the detection that the second electrodes are no longer electrically conducted with each other.

18. The method according to claim 16, wherein the illuminants includes:

at least one first illuminant disposed in the electronic device such as to be visible from above a surface of water when the electronic device is submerged in the first submersion orientation, and at least one second illuminant disposed in the electronic device such as to be visible from above a surface of water when the electronic device is submerged in the second submersion orientation, the lighting circuit includes a first lighting circuit and a second lighting circuit, and the operating of the controller to send the lighting signal includes:

operating the controller to send the first lighting circuit a lighting signal to light up the at least one first illuminant for a period of time from the detection that the first electrodes are electrically conducted with each other at least to the detection that the first electrodes are no longer electrically conducted with each other, and operating the controller to send the second lighting circuit a lighting signal to light up the at least one second illuminant for a period of time from the detection that the second electrodes are electrically conducted with each other at least to the detection that the second electrodes are no longer electrically conducted with each other.

19. The method according to claim 13, wherein the orientation detector is an orientation sensor for sending first and second orientation signals in accordance with first and second submersion orientations, respectively, of the electronic device, the illuminants includes:

at least one first illuminant disposed in the electronic device such as to be visible from above a surface of water when the electronic device is submerged in the first submersion orientation, and at least one second illuminant disposed in the electronic device such as to be visible from above a surface of water when the electronic device is submerged in the second submersion orientation, the operating of the submersion detector to detect the submersion includes operating the submersion detector to detect that a pair of electrodes of the submersion detector are submerged and brought into electrical conduction with each other when the electronic device is submerged, the operating of the submersion detector to detect the retrieval includes operating the submersion detector to detect that the electrodes of the submersion detector are no longer submerged nor in electrical conduction with each other, and the operating of the controller to send the lighting signal includes:

operating the controller to send to the lighting circuit a lighting signal to light up the at least one first illuminant when the electrodes of the submersion detector are brought into electrical conduction with each other and the first orientation signal from the orientation sensor is input to the controller, and operating the controller to send to the lighting circuit a lighting signal to light up the at least one second illuminant when the electrodes of the submersion detector are brought into electrical conduction with each other and the second orientation signal from the orientation sensor is input to the controller.

20. The method according to claim 13, wherein the orientation detector is an orientation sensor for sending first and second orientation signals in accordance with first and second submersion orientations, respectively, of the electronic device, the illuminants includes:

at least one first illuminant disposed in the electronic device such as to be visible from above a surface of water when the electronic device is submerged in the first submersion orientation, and at least one second illuminant disposed in the electronic device such as to be visible from above a surface of water when the electronic device is submerged in the second submersion orientation, the lighting circuit comprises a first lighting circuit and a second lighting circuit, the operating of the submersion detector to detect the submersion includes operating the submersion detector to detect that a pair of electrodes of the submersion detector are submerged and brought into electrical conduction with each other when the electronic device is submerged, the operating of the submersion detector to detect the retrieval includes operating the submersion detector to detect that the electrodes of the submersion detector are no longer submerged nor in electrical conduction with each other, and the operating of the controller to send the lighting signal includes:

operating the controller to send the first lighting circuit a lighting signal to light up the at least one first illuminant when the electrodes of the submersion detector are brought into electrical conduction with each other and the first orientation signal from the orientation sensor is input to the controller, and operating the controller to send the second lighting circuit a lighting signal to light up the at least one second illuminant when the electrodes of the submersion detector are brought into electrical conduction with each other and the second orientation signal from the orientation sensor is input to the controller.

\* \* \* \* \*